(12) United States Patent
Lee et al.

(10) Patent No.: US 11,367,441 B2
(45) Date of Patent: Jun. 21, 2022

(54) ELECTRONIC APPARATUS AND CONTROL METHOD THEREOF

(71) Applicant: SAMSUNG ELECTRONICS CO., LTD., Suwon-si (KR)

(72) Inventors: Yeonho Lee, Suwon-si (KR); Kyenghun Lee, Suwon-si (KR); Saebom Jang, Suwon-si (KR); Silas Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 186 days.

(21) Appl. No.: 16/671,536

(22) Filed: Nov. 1, 2019

(65) Prior Publication Data

US 2020/0143809 A1    May 7, 2020

(30) Foreign Application Priority Data

Nov. 1, 2018   (KR) .................. 10-2018-0132717
Oct. 18, 2019   (KR) .................. 10-2019-0129837

(51) Int. Cl.
  *G10L 15/22*    (2006.01)
  *G10L 15/30*    (2013.01)
(52) U.S. Cl.
  CPC .............. *G10L 15/22* (2013.01); *G10L 15/30* (2013.01); *G10L 2015/227* (2013.01)
(58) Field of Classification Search
  USPC ..................................................... 704/1–504
  See application file for complete search history.

(56) References Cited

U.S. PATENT DOCUMENTS 9,684,711 B2   6/2017  Ahn et al.
9,733,895 B2 *  8/2017  Kim ................. H04N 21/42203
(Continued)

FOREIGN PATENT DOCUMENTS

JP          3576116      10/2004
JP       2016-071867      5/2016
(Continued)

OTHER PUBLICATIONS

Search Report and Written Opinion dated Feb. 17, 2020 in counterpart International Application No. PCT/KR2019/014704.
(Continued)

*Primary Examiner* — Marcus T Riley
(74) *Attorney, Agent, or Firm* — Nixon & Vanderhye P.C.

(57) ABSTRACT

An electronic apparatus and a control method thereof are provided. A method of controlling an electronic apparatus according to an embodiment of the disclosure includes: receiving input of a first utterance, identifying a first task for the first utterance based on the first utterance, providing a response to the first task based on a predetermined response pattern, receiving input of a second utterance, identifying a second task for the second utterance based on the second utterance, determining the degree of association between the first task and the second task, and setting a response pattern for the first task based on the second task based on the determined degree of association satisfying a predetermined condition. The control method of an electronic apparatus may use an artificial intelligence model trained according to at least one of machine learning, a neural network, or a deep learning algorithm.

20 Claims, 16 Drawing Sheets

(56) References Cited

U.S. PATENT DOCUMENTS

| | | | |
|---|---|---|---|
| 10,440,167 B2 | 10/2019 | Choi et al. | |
| 10,547,729 B2 | 1/2020 | Choi et al. | |
| 10,803,862 B2* | 10/2020 | Jang | G06F 3/0484 |
| 10,832,674 B2* | 11/2020 | Jaygarl | G06F 40/30 |
| 2012/0035935 A1 | 2/2012 | Park et al. | |
| 2014/0122618 A1 | 5/2014 | Duan | |
| 2014/0278413 A1* | 9/2014 | Pitschel | G10L 15/22 |
| | | | 704/243 |
| 2015/0160919 A1* | 6/2015 | Kim | H04N 21/4223 |
| | | | 704/275 |
| 2016/0379638 A1* | 12/2016 | Basye | G10L 15/18 |
| | | | 704/235 |
| 2017/0300990 A1 | 10/2017 | Tanaka et al. | |
| 2018/0075847 A1 | 3/2018 | Lee et al. | |
| 2018/0144064 A1 | 5/2018 | Krasadakis | |
| 2018/0165581 A1* | 6/2018 | Hwang | G06N 5/04 |
| 2018/0203833 A1 | 7/2018 | Liang et al. | |
| 2018/0278740 A1* | 9/2018 | Choi | G06F 3/04817 |
| 2018/0285070 A1* | 10/2018 | Yoon | G06F 3/0481 |
| 2018/0308480 A1* | 10/2018 | Jang | G06F 3/167 |
| 2019/0013024 A1* | 1/2019 | Jeon | G10L 15/26 |
| 2019/0066677 A1* | 2/2019 | Jaygarl | G10L 15/26 |
| 2019/0080252 A1* | 3/2019 | Shinn | G06F 9/4413 |
| 2019/0260866 A1 | 8/2019 | Choi et al. | |
| 2020/0143809 A1* | 5/2020 | Lee | G10L 15/22 |

FOREIGN PATENT DOCUMENTS

| | | |
|---|---|---|
| KR | 10-2012-0045415 | 5/2012 |
| KR | 10-1508429 | 4/2015 |
| KR | 10-2018-0019869 | 2/2018 |
| KR | 10-2018-0109631 | 10/2018 |

OTHER PUBLICATIONS

Extended Search Report dated Mar. 23, 2020 in counterpart European Patent Application No. 19206720.5.

European Examination Report dated Nov. 4, 2021 for EP Application No. 19206720.5.

* cited by examiner

ELECTRONIC APPARATUS AND CONTROL METHOD THEREOF

CROSS-REFERENCE TO RELATED APPLICATIONS

This application is based on and claims priority under 35 U.S.C. § 119 to Korean Patent Application No. 10-2018-0132717, filed on Nov. 1, 2018, in the Korean Intellectual Property Office, and Korean Patent Application No. 10-2019-0129837, filed on Oct. 18, 2019 in the Korean Intellectual Property Office, the disclosures of which are incorporated by reference herein in their entireties.

BACKGROUND

1. Field

The disclosure relates to an electronic apparatus and a control method thereof, and for example, to an electronic apparatus capable of providing a response to a user utterance and an additional response related to the user utterance, and a control method thereof.

The disclosure also relates to an artificial intelligence (AI) system simulating functions of a human brain such as cognition and determination utilizing a machine learning algorithm, and application thereof.

2. Description of Related Art

An artificial intelligence (AI) system may refer to a computer system implementing intelligence of a human level, and may include a system wherein a machine learns, determines, and becomes smarter by itself, unlike conventional rule-based smart systems. An artificial intelligence system shows a more improved recognition rate as it is used more, and becomes capable of understanding user preference more correctly. For this reason, conventional rule-based smart systems are gradually being replaced by deep learning-based artificial intelligence systems.

An artificial intelligence technology may include machine learning (deep learning) and element technologies utilizing machine learning.

Machine learning may refer, for example, to an algorithm technology of classifying/learning the characteristics of input data by itself. Meanwhile, an element technology may refer, for example, to a technology utilizing a machine learning algorithm such as deep learning, and includes fields of technologies such as linguistic understanding, visual understanding, inference/prediction, knowledge representation, and operation control.

Examples of various fields to which artificial intelligence technologies are applied are as follows. Linguistic understanding may refer, for example, to a technology of recognizing languages/characters of humans, and applying/processing them, and includes natural speech processing, machine translation, dialog systems, queries and answers, voice recognition/synthesis, and the like. Visual understanding may refer, for example, to a technology of recognizing an object in a similar manner to human vision, and processing the object, and may include recognition of an object, tracking of an object, search of an image, recognition of humans, understanding of a scene, understanding of a space, improvement of an image, and the like. Inference/prediction may refer, for example, to a technology of determining information and making logical inference and prediction, and may include knowledge/probability based inference, optimization prediction, preference based planning, recommendation, and the like. Knowledge representation may refer, for example, to a technology of automatically processing information of human experiences into knowledge data, and may include knowledge construction (data generation/classification), knowledge management (data utilization), and the like. Operation control may refer, for example, to a technology of controlling autonomous driving of vehicles and movements of robots, and may include movement control (navigation, collision, driving), operation control (behavior control), and the like.

Meanwhile, in the case of an electronic apparatus including a dialog system providing a response to a user inquiry, the electronic apparatus merely provides a response to a user inquiry, but does not provide an additional response to the user inquiry. Accordingly, there is inconvenience that a user has to perform a lot of inquiries or a long inquiry for achieving desired information, and also, there is a problem that a dialog time between a user and a dialog system becomes long.

SUMMARY

Embodiments of the disclosure address the aforementioned problem, and relate to an electronic apparatus capable of providing a response to a user utterance and an additional response related to the user utterance based on the preference information and dialog history of the user, and a control method thereof.

An example control method of an electronic apparatus according to an example embodiment includes the steps of receiving input of a first utterance, identifying a first task for the first utterance based on the first utterance, providing a response to the first task based on a predetermined response pattern, receiving input of a second utterance, identifying a second task for the second utterance based on the second utterance, and determining a degree of association between the first task and the second task, and setting a response pattern for the first task based on the second task based on the determined degree of association satisfying a predetermined condition.

The response pattern may be determined while including at least one of information related to the length of a response to an utterance or information related to the types of information included in the response to the utterance.

The predetermined response pattern may be a response pattern selected by a command, or a response pattern automatically set based on the utterance history of the electronic apparatus.

The method may input a voice according to the first utterance into a trained artificial intelligence model to obtain information on an acoustic feature of the first utterance, and recognize the user based on the information on the obtained acoustic feature. The predetermined response pattern may be determined based on the recognized conversation history and preference information of the user.

The predetermined condition may be a condition wherein information on the degree of association between the first task and the second task is equal to or greater than a threshold value.

The control method may further include the steps of determining whether a third task for a third utterance is associated with the first task based on receiving input of a third utterance, and providing a response based on the set response pattern for the first task.

The control method may further include the steps of receiving input of a third utterance, and identifying a third task for the third utterance based on the third utterance, and determining the degree of association between the first task and the third task. The step of setting may further include the steps of determining priorities of the second task and the third task, based on the determined degree of association between the first task and the third task satisfying a predetermined condition, and setting a response pattern for the first task based on the determined priorities, the second task, and the third task.

The control method may include the steps of acquiring feedback for the provided response, and updating the degree of association between the first task and the second task based on the acquired feedback.

The control method may further include the step of storing the first task and the second task in the form of ontology based on the degree of association between the first task and the second task.

At least one of the steps of identifying a first task, determining the degree of association, setting a response pattern, or providing a response may be performed by an artificial intelligence model. The artificial intelligence model may include a plurality of layers respectively including at least one node, and each of the at least one node may include a neural network model having a connection weight for interpretation of an input value.

An example electronic apparatus according to an example embodiment of the disclosure may include a memory configured to store at least one command, and a processor configured to execute the at least one command to control the electronic apparatus. The processor may control the electronic apparatus to: receive input of a first utterance, identify a first task for the first utterance based on the first utterance, provide a response to the first task based on a predetermined response pattern, and receive input of a second utterance, identify a second task for the second utterance based on the second utterance, and determine a degree of association between the first task and the second task, and set a response pattern for the first task based on the second task based on the determined degree of association satisfying a predetermined condition.

The response pattern may be determined while including at least one of information related to the length of a response to an utterance or information related to the types of information included in the response to the utterance.

The predetermined response pattern may be a response pattern selected by a command, or a response pattern automatically set based on the utterance history of the electronic apparatus.

The predetermined condition may be a condition wherein information on the degree of association between the first task and the second task is equal to or greater than a threshold value.

The processor may control the electronic apparatus to input a voice according to the first utterance into a trained artificial intelligence model to obtain information on an acoustic feature of the first utterance, and recognize the user based on the information on the obtained acoustic feature. The predetermined response pattern is determined based on the recognized conversation history and preference information of the user.

The processor may control the electronic apparatus to determine whether a third task for a third utterance is associated with the first task based on receiving input of a third utterance, and provide a response based on the set response pattern for the first task.

The processor may control the electronic apparatus to receive input of a third utterance, identify a third task for the third utterance based on the third utterance, and determine the degree of association between the first task and the third task, and determine priorities of the second task and the third task based on the determined degree of association between the first task and the third task satisfying a predetermined condition, and set a response pattern for the first task based on the determined priorities, the second task, and the third task.

In addition, the processor may control the electronic apparatus to acquire a feedback for the provided response, and update the degree of association between the first task and the second task based on the acquired feedback.

The processor may control the electronic apparatus to store the first task and the second task in the form of ontology in the memory based on the degree of association between the first task and the second task.

At least one of the operations of identifying a first task, determining the degree of association, setting a response pattern, or providing a response may be performed by an artificial intelligence model. The artificial intelligence model may include a plurality of layers respectively including at least one node, and each of the at least one node may include a neural network model having a connection weight for interpretation of an input value.

According to the aforementioned various example embodiments of the disclosure, an electronic apparatus may provide various responses to a user utterance, and thereby reduce unnecessary dialog turns.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
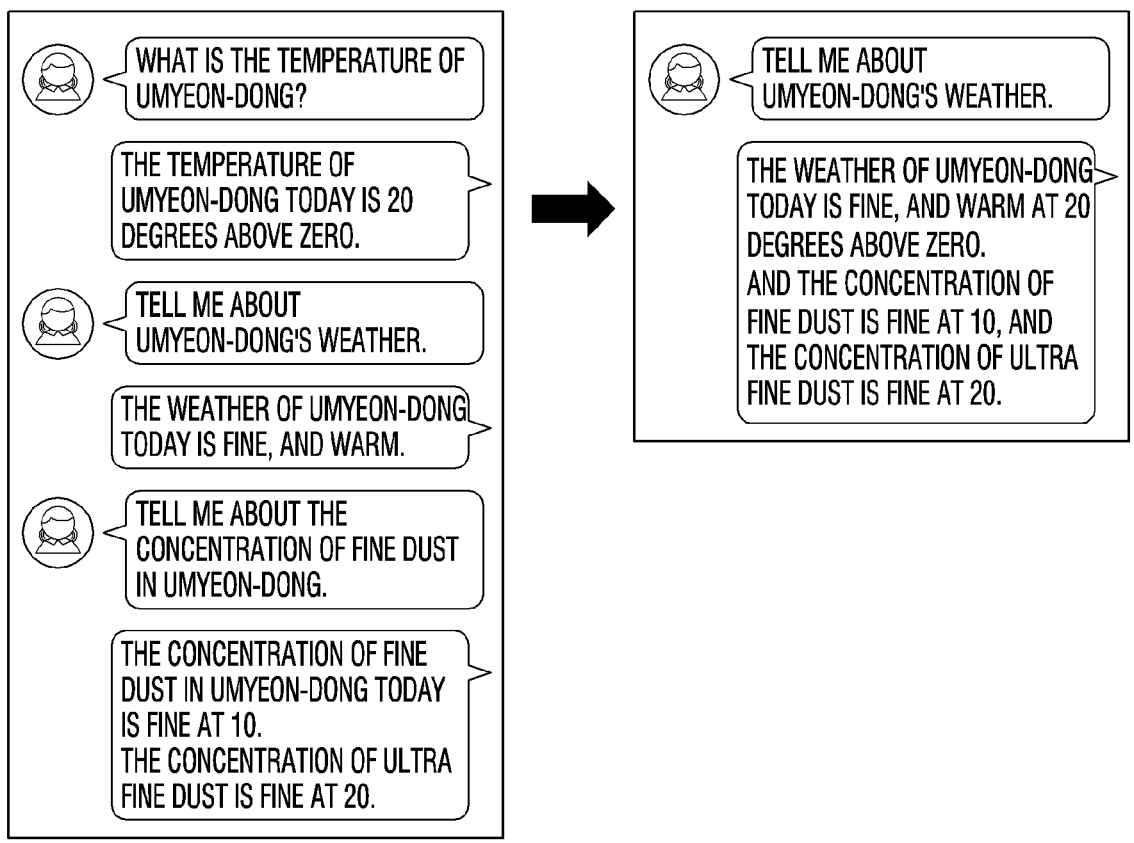
FIG. 1 is a diagram illustrating an example operation of an example electronic apparatus according to an embodiment of the disclosure.

Hereinafter, various example embodiments of the disclosure will be described with reference to the accompanying drawings. Meanwhile, it should be noted that the various example embodiments are not for limiting the technology described in the disclosure to a specific embodiment, but they should be interpreted to include various modifications, equivalents and/or alternatives of the embodiments of the disclosure. Also, with respect to the descriptions of drawings, similar reference numerals may be used for similar components.

In the disclosure, expressions such as "have," "may have," "include" and "may include" should be understood as denoting that there are such characteristics (e.g.: elements such as numerical values, functions, operations and components), and the expressions are not intended to exclude the existence of additional characteristics.

In the disclosure, the expressions "A or B," "at least one of A and/or B," or "one or more of A and/or B" and the like may include all possible combinations of the listed items. For example, "A or B," "at least one of A and B," or "at least one of A or B" refer to all of the following cases: (1) including at least one A, (2) including at least one B, or (3) including at least one A and at least one B.

The expressions "first," "second" and the like used in the disclosure may be used to describe various elements regardless of any order and/or degree of importance. Such expressions may be used to distinguish one element from another element, and are not intended to limit the elements.

The description in the disclosure that one element (e.g.: a first element) is "(operatively or communicatively) coupled with/to" or "connected to" another element (e.g.: a second element) should be understood to include both the case where the one element is directly coupled to the another element, and the case where the one element is coupled to the another element through still another element (e.g.: a third element). The description that one element (e.g.: a first element) is "directly coupled" or "directly connected" to another element (e.g.: a second element) may be interpreted to refer to a situation in which still another element (e.g.: a third element) does not exist between the one element and the another element.

The expression "configured to" used in the disclosure may be interchangeably used with other expressions such as "suitable for," "having the capacity to," "designed to," "adapted to," "made to" and "capable of," depending on cases. The term "configured to" does not necessarily refer to a device that is "specifically designed to" in terms of hardware. Instead, under some circumstances, the expression "a device configured to" may refer to a device that "is capable of" performing an operation together with another device or component. For example, the phrase "a subprocessor configured to perform A, B and C" may refer, for example, and without limitation, to a dedicated processor (e.g.: an embedded processor) for performing the corresponding operations, a generic-purpose processor (e.g.: a CPU or an application processor) that can perform the corresponding operations by executing one or more software programs stored in a memory device, or the like.

An electronic apparatus according to various example embodiments of the disclosure may include, for example, and without limitation, at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical instrument, a camera, a wearable device, or the like. A wearable device may include, for example, and without limitation, at least one of an accessory-type device (e.g.: a watch, a ring, a bracelet, an ankle bracelet, a necklace, glasses, a contact lens, or a head-mounted-device (HMD)), a device integrated with fabrics or clothing (e.g.: electronic clothing), a body-attached device (e.g.: a skin pad or a tattoo), an implantable circuit, or the like. In some embodiments, an electronic apparatus may include, for example, and without limitation, at least one of a television, a digital video disk (DVD) player, an audio, a refrigerator, an air conditioner, a cleaner, an oven, a microwave oven, a washing machine, an air cleaner, a set top box, a home automation control panel, a security control panel, a media box (e.g.: Samsung HomeSync™, Apple TV™, or Google TV™), a game console (e.g.: Xbox™, PlayStation™), an electronic dictionary, an electronic key, a camcorder, an electronic photo frame, or the like.

In another example embodiment of the disclosure, an electronic apparatus may include, for example, and without limitation, at least one of various types of medical instruments (e.g.: various types of portable medical measurement instruments (a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (1-DR), a vehicle infotainment device, an electronic device for vessels (e.g.: a navigation device for vessels, a gyrocompass, etc.), avionics, a security device, a head unit for a vehicle, an industrial or household robot, a drone, an ATM of a financial institution, a point of sales (POS) of a store, an Internet of Things (IoT) device (e.g.: a light bulb, various types of sensors, a sprinkler device, a fire alarm, a thermostat, a street light, a toaster, exercise equipment, a hot water tank, a heater, a boiler, etc.), or the like.

In the disclosure, the term "user" may refer to a person who uses an electronic apparatus or an apparatus using an electronic apparatus (e.g.: an artificial intelligence electronic apparatus).

Hereinafter, the disclosure will be described in greater detail with reference to the accompanying drawings.

FIG. 1 is a diagram illustrating an example operation of an electronic apparatus according to an embodiment of the disclosure.

As illustrated at the left side of FIG. 1, an electronic apparatus 100 (refer, for example, to FIG. 2) may include a dialog system for providing a response to a user inquiry. A conventional dialog system could provide only a response to a user inquiry as illustrated in the left side of FIG. 1. For example, the electronic apparatus 100 may provide only a response informing about the temperature to an inquiry inquiring about the temperature, and only a response informing about the weather to an inquiry inquiring about the weather, and only a response informing about the degree of atmospheric pollution to an inquiry inquiring about the degree of atmospheric pollution.

According to the conventional dialog system illustrated in the left side of FIG. 1, a user could perform respective inquiries regarding a temperature check, a weather check, and an atmospheric pollution check and acquire responses for the respective inquiries, or perform an inquiry inquiring about all of a temperature check, a weather check, and an atmospheric pollution check and acquire a response.

However, even when a user of the electronic apparatus 100 mostly performs an inquiry inquiring about the weather and an inquiry inquiring about the degree of atmospheric pollution together with an inquiry inquiring about the temperature, the electronic apparatus 100 provides only responses to the user inquiries, and thus unnecessary dialog turns are generated. Accordingly, according to an embodiment of the disclosure, for reducing unnecessary dialog turns, the electronic apparatus 100 may learn the dialog history of the user and provide information on the temperature and atmospheric pollution regarding an inquiry inquiring about the weather, as illustrated at the right side of FIG. 1.

For example, the electronic apparatus 100 may provide both a response to a user inquiry and a response to an additional inquiry that a user is expected to additionally ask, based, for example, on the dialog history of the user, the preference information set by the user, etc.

According to an embodiment of the disclosure, the electronic apparatus 100 may receive input of a first utterance of a user, identify a first task for the first utterance, and provide a response to the first task according to a predetermined response pattern. Thereafter, the electronic apparatus 100 may receive input of a second utterance, identify a second task for the second utterance, and based on the degree of association between the first task and the second task satisfying a predetermined condition, set a response pattern for the first task based on the second task. Accordingly, where the first utterance is input again at a later time, a response may be provided according to the response pattern for the first task set based on the second task.

A response pattern may refer, for example, to at least one of the length of a response, the types of information included in a response and/or the number of pieces of information included in a response. Setting of a response pattern may include newly generating a response pattern, and changing the previous response pattern. Setting of a response pattern may be performed by a manual method by a user, or may be performed automatically.

According to an embodiment, the electronic apparatus 100 may perform obtaining or identifying a user. Accordingly, the electronic apparatus 100 may separately store different user conversation history and preference information set by the user for each user.

For example, when the electronic apparatus 100 is logged in to an AI-based service, such as a smartphone, the electronic apparatus 100 may update, based on a user utterance, the user's conversation history and preference information which are currently logged in.

When the electronic apparatus 100 is a common apparatus that can be used by a plurality of users, such as an AI speaker, the electronic apparatus 100 may recognize a user based on a user utterance. A process of recognizing the user may include, for example, a process of determining the user based on features of tone, intonation, pronunciation, speed, or the like of the user utterance. For example, the electronic apparatus 100 may input a received user utterance into a trained artificial intelligence model, and obtain information on an acoustic feature of a user utterance, such as information on a speech of a user utterance, information on unit phonemes of a user utterance, and the like, through the trained artificial intelligence model. In addition, the electronic apparatus 100 may compare information on the obtained acoustic feature of the user utterance with the pre-stored information on the acoustic feature of the user utterance, and recognize a user who is a subject of the received user utterance.

The electronic apparatus 100 may, based on the user being recognized based on the user utterance, update the recognized conversation history and preference information of the user.

When the electronic apparatus 100 includes a camera, the electronic apparatus may obtain a user image through the camera, and recognize the user by performing object recognition based on the obtained user image.

For example, the electronic apparatus 100 may extract a feature of an object included in the obtained user image, obtain a probability that an object included in the obtained user image corresponds to each of a plurality of categories for classifying an object based on the extracted object feature, and obtain an object included in the obtained user image. When the object included in the obtained user image is recognized, the electronic apparatus 100 may compare the information on the identified object with the information on the object included in the pre-stored user image, and recognize a user corresponding to the user image.

A process of recognizing a user based on the user image, like the process of recognizing a user based on a user utterance, may, for example, be performed through an artificial intelligence model including artificial neural networks, such as, for example, and without limitation, a deep neural network (DNN), convolution neural network (CNN), recurrent neural network (RNN), generative adversarial networks (GAN), or the like.

Figure 2:
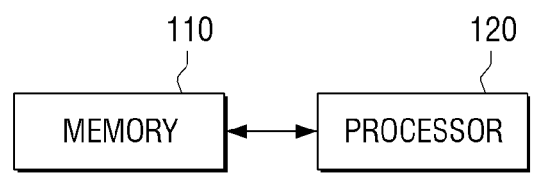
FIG. 2 is a block diagram illustrating an example configuration of an example electronic apparatus according to an embodiment of the disclosure.

FIG. 2 is a block diagram illustrating an example configuration of an example electronic apparatus according to an embodiment of the disclosure. As illustrated in FIG. 2, the electronic apparatus 100 may include a memory 110 and a processor (e.g., including processing circuitry) 120.

The memory 110 may store commands or data related to at least one other component of the electronic apparatus 100. For example, the memory 110 may be implemented as a non-volatile memory, a volatile memory, a flash-memory, a hard disc drive (HDD) or a solid state drive (SSD), etc. Further, the memory 110 may be accessed by the processor 120, and reading/recording/correcting/deleting/updating, etc. of data by the processor 120 may be performed. In the disclosure, the term memory may include a memory 110, a ROM (not shown) inside the processor 120, a RAM (not shown), or a memory card (not shown) (e.g., a micro SD card, a memory stick) installed on the electronic apparatus 100. Also, in the memory 110, programs and data, etc. for constituting various types of screens to be displayed in a display area of the display 150 may be stored.

Figure 4:
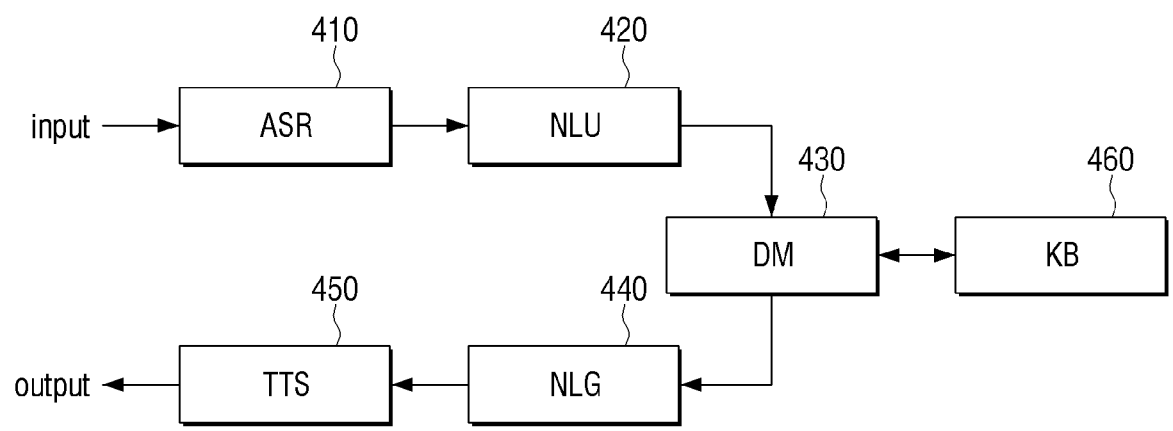
FIG. 4 is a block diagram illustrating an example dialog system according to an embodiment of the disclosure.

The memory 110 may store a dialog system providing a response to a user input (for example, a user utterance). A dialog system may include, for example, and without limitation, an Automatic Speech Recognition (ASR) part (e.g., including processing circuitry and/or executable program elements) 410, a Natural Language Understanding (NLU) part (e.g., including processing circuitry and/or executable program elements) 420, a Dialog Manager (DM) (e.g., including processing circuitry and/or executable program elements) 430, a Natural Language Generating (NLG) part (e.g., including processing circuitry and/or executable program elements) 440, a Text-to-Speech (TTS) (e.g., including processing circuitry and/or executable program elements) 450, and a Knowledge Database 460, as illustrated in FIG. 4.

The Automatic Speech Recognition part 410 may include various processing circuitry and/or executable program elements for converting a user utterance into the form of a text that the electronic apparatus 100 can process, by performing voice recognition for the user utterance input through a microphone, etc. The Automatic Speech Recognition part 410 may include a language model for correcting a conversion error, a unique utterance of a user, an utterance error, etc. The Natural Language Understanding part 420 may include various processing circuitry and/or executable program elements for identifying a task related to an entity and an intent of a user utterance based on a result of voice recognition. For example, the Natural Language Understanding part 420 may perform sentence analysis by interpreting a sentence through analysis of the structure and main components of the sentence and using statistics/analysis, etc. The Dialog Manager 430 may include various processing circuitry and/or executable program elements for acquiring information on a response to a user utterance based on a result of natural language understanding and data stored in the Knowledge Database 460. The Dialog Manager 430 may be implemented, for example, on a Frame basis, an Agent basis, etc., and may be implemented through modeling based on a Markov Decision Process (MDP), and Reinforcement Learning. The Dialog Manager 430 may acquire information for generating a response, and as described above, acquired information may be determined based on a task identified through the Natural Language Understanding part 420 and data stored in the Knowledge Database 460. The Natural Language Generating part 440 may include various processing circuitry and/or executable program elements and may acquire a natural language as a response to a user utterance based on information acquired through the Dialog Manager 430. The TTS 450 may include various processing circuitry and/or executable program elements and convert the acquired natural language into a voice. By the above, the dialog system may provide a response to a user utterance as a voice, and a user may perform a dialog with the electronic apparatus 100.

For example, the Natural Language Generating part 440 according to an embodiment of the disclosure may input information acquired through the Dialog Manager 430 and the Knowledge Database 460 as an input value of an artificial intelligence model, and acquire a natural language as a response to a user utterance.

The knowledge Database 460 may, for example, store information necessary for generating a response at the Dialog Manager 430. Data stored in the knowledge Database 460 may be diverse. For example, the knowledge Database 460 may store user preference information. User preference information may refer, for example, to a response type that a user prefers regarding a user utterance. A response type that a user prefers may be, for example, a response type providing a response to a user utterance or a response type providing an additional inquiry regarding a user utterance. A response type that a user prefers may include information for setting details of a response (or an inquiry) for each of a response type providing a response to a user utterance or a response type providing an additional inquiry regarding a user utterance. For example, user preference information may be a type of providing an additional inquiry regarding a user utterance, and an additional inquiry may be information on an inquiry constituted in the form of Yes or No. User preference information may, for example, be a type of providing an additional inquiry regarding a user utterance, and an additional inquiry may be information on an inquiry constituted to select one of a plurality of alternatives. User preference information may be a type of providing a response to a user utterance, and information related to the number of pieces of information included in a response.

The knowledge Database 460 may store the past utterance history of a user. For example, the knowledge Database 460 may store history information related to a past user utterance and a response to the utterance, and a re-utterance regarding the response. Methods of storing history information may be diverse. For example, history information may be include ontology including information on the degree of association among a plurality of tasks regarding a plurality of user utterances. History information may be in a form wherein information on a user utterance, a response to the utterance, and a re-utterance regarding the response is stored in the form of a data set (e.g., (an inquiry, a response)).

The memory 110 may store an artificial intelligence agent for operating a dialog system. For example, the electronic apparatus 100 may use an artificial intelligence agent for generating a natural language as a response to a user utterance. An artificial intelligence agent may refer, for example, to a dedicated program for providing artificial intelligence (AI) based services (e.g., a voice recognition service, an agent service, a translation service, a search service, etc.), and may be executed, for example, and without limitation, by a conventional generic-purpose processor (e.g., a CPU), or a separate AI-dedicated processor (e.g., a GPU, etc.), or the like.

For example, where a user utterance is input, an artificial intelligence agent may operate. An artificial intelligence agent may input a user inquiry into a trained artificial intelligence learning model and acquire a response. If a user utterance (for example, a trigger voice for executing an artificial intelligence function) is input or a predetermined button (e.g., a button for executing an artificial intelligence agent function) is selected, an artificial intelligence agent may operate. An artificial intelligence agent may have already been executed before a user utterance was input or a predetermined button was selected. In this example, after a user utterance is input or a predetermined button is selected, an artificial intelligence agent of the electronic apparatus 100 may acquire a natural language as a response to the user utterance. An artificial intelligence agent may be in a stand-by state before a user utterance is input or a predetermined button is selected. A stand-by state may refer, for example, to a state wherein receipt of a predefined user input is detected for controlling the start of an operation of an artificial intelligence agent. If a user utterance is input or a predetermined button is selected while an artificial intelligence agent is in a stand-by state, the electronic apparatus 100 may operate the artificial intelligence agent, and acquire a natural language as a response to the user utterance.

According to an embodiment of the disclosure, the memory 110 may store an artificial intelligence model trained to generate (or acquire) a natural language. In the disclosure, a trained artificial intelligence model may be constructed in consideration of a field to which a recognition model is applied or the computer performance of an apparatus, etc. For example, an artificial intelligence model may be trained to acquire a natural language using information acquired from the conversation manager 430 and the knowledge database 460 as input data. For generating a natural language that is natural, a trained artificial intelligence model may be a model based on a neural network. An artificial intelligence model may, for example, be designed to simulate a brain structure of a human on a computer, and may include a plurality of network nodes having weights that simulate neurons of a neural network of a human. The plurality of network nodes may each form a connection relationship so as to simulate synaptic activities of neurons exchanging signals via synapses. Further, a document summary model may include, for example, a neural network model, or a deep learning model developed from a neural network model. In a deep learning model, a plurality of network nodes may be located in different depths (or, layers) from one another, and exchange data according to a relationship of convolution connection. Examples of a trained artificial intelligence model, may include, for example, and without limitation, a Deep Neural Network (DNN), a Recurrent Neural Network (RNN), a Bidirectional Recurrent Deep Neural Network (BRDNN), and the like, but a trained artificial intelligence model is not limited thereto.

In the aforementioned embodiment, it was described that an artificial intelligence model is stored in the electronic apparatus 100, but this is merely an example, and an artificial intelligence model may be stored in another electronic apparatus. For example, an artificial intelligence model may be stored in at least one external server. The electronic apparatus 100 can receive input of a user utterance and transmit the utterance to an external server storing an artificial intelligence model, and the artificial intelligence model stored in the external server can input the user utterance received from the electronic apparatus 100 as an input value and output a result.

The processor 120 may include various processing circuitry and be electronically connected with the memory 110 and control the overall operations and functions of the electronic apparatus 100.

For example, the processor 120 may receive input of a user utterance, and determine a task related to the user utterance based on the input user utterance. A task related to a user utterance may, for example, include information necessary for a response to a user utterance. For example, where a user utterance is an inquiry inquiring about the weather, the task may be a weather check. In an example in which a user utterance is an inquiry inquiring about the temperature, the task may be a temperature check. In an example in which a user utterance is an inquiry inquiring about the degree of atmospheric pollution, the task may be an atmospheric pollution check.

The processor 120 may determine a task related to a user utterance and a response pattern for an additional task related to the task based on a task related to a user utterance. For example, the processor 120 may identify a first task for a first user utterance and a second task for a second user utterance. If the degree of association between the first task and the second task satisfies a predetermined condition, the processor 120 may set a response pattern for the first utterance based on the second task. For example, where the first task is associated with the second task, the processor 120 may determine a response pattern based on the first task and the second task. A predetermined condition may, for example, be a condition wherein information on the degree of association between the first task and the second task is equal to or greater than a threshold value.

A response pattern may be determined by various methods. For example, a response pattern may include at least one of information related to the length of a response to a user utterance or information related to the types of information included in the response to the user utterance, and may be determined based on the aforementioned information. A response pattern may be determined based on utterance history including a user utterance and an additional utterance for performing an additional task and user preference information. An additional task (or a second task) may be a task related to a determined task (or a first task). For example, where a determined task is a temperature check, an additional task may be a weather check, an atmospheric pollution check, etc. having a high degree of association with a temperature check.

A response pattern may be a response pattern selected by a user command, or a response pattern automatically generated based on utterance history. For example, where there is a user command with a condition that a first utterance and a second utterance are input within a predetermined time period, if the second utterance is input within a predetermined time after the first utterance is input, the processor 120 may determine that the first task for the first utterance and the second task for the second utterance are associated with each other, and determine a response pattern. If a user command for a utterance for a predetermined category is input, the processor 120 may determine that the first task for the first utterance and the second task for the second utterance with respect to the category are associated with each other, and determine a response pattern. Where a user command is associated with the length and type of a response, the processor 120 may determine a response pattern based on the length of a response or the type of a response determined according to the user command. The processor 120 may determine a response pattern according to the aforementioned various user commands, but the disclosure is not limited thereto, and a response pattern can be set automatically.

The processor 120 may acquire response information for a task related to a user utterance and response information for an additional task, and provide the acquired response information and additional response information to the user. For example, the processor 120 may provide a response for a determined response pattern based on the first task and the second task.

The processor 120 may store information on the degree of association between a task and an additional task in the memory 110. For example, the processor 120 may store information on the degree of association between a task and an additional task in the knowledge database 460.

An additional task (or a second task) may be a task of which degree of association with a task determined according to a user utterance is greater than a threshold value. For example, the processor 120 may determine a task of which information on the degree of association with a task determined according to a user utterance is greater than a threshold value as an additional task. For example, where a task determined according to a user utterance is a temperature check, and the degree of association between the temperature check task and a weather check task is 0.9, and the degree of association between the temperature check task and an atmospheric pollution check task is 0.5, and the threshold value is 0.7, the processor 120 may determine the weather check task of which degree of association with the temperature check task is greater than 0.7 as an additional task, and may not determine the atmospheric pollution check task of which degree of association with the temperature check task is smaller than 0.7 as an additional task.

The processor 120 may receive input of a third utterance of a user, identify a third task for the third utterance, and determine the degree of association between the identified third task and the first task. If the degree of association between the first task and the third task satisfies a predetermined condition, the processor 120 may determine the priorities of the second task and the third task, and set a response pattern for the first utterance based on the determined priorities, the second task, and the third task.

For example, where a plurality of additional tasks are determined, the processor 120 may determine information on the degree of association between a task for a user utterance and the plurality of determined tasks, and determine an order of providing responses to additional tasks based on the determined information on the degree of association. For example, where a task for a user utterance is a temperature check task, and determined additional tasks are a weather check task, an atmospheric pollution check task, and a population density check, and the degree of association between the temperature check task and the weather check task is 0.9, and the degree of association between the temperature check task and the atmospheric pollution check task is 0.5, and the degree of association between the temperature check task and the population density check task is 0.3, the processor 120 may provide an additional response for a task having a high degree of association first. For example, with respect to a user utterance "What is the temperature of Seoul today?", the processor 120 may provide responses in the order of a response for the temperature check task for the user utterance, an additional response for the weather check task, an additional response for the atmospheric pollution check task, and an additional response for the population density check task, like "The temperature of Seoul today is 20 degrees, the weather is fine, the concentration of fine dust is 10, and the population density is low".

According to another embodiment of the disclosure, where a response pattern set for a first task for a first utterance is set based on a second task associated with the first task, if a third utterance different from the first and second utterances is input, the processor 120 may determine whether a third task for the third utterance is associated with the first task for the first utterance, and if there is association, the processor 120 may provide a response according to a response pattern set for the first task.

The processor 120 may acquire a feedback for the provided response, and update the degree of association between the first task and the second task based on the acquired feedback. For example, the processor 120 may acquire a user feedback for the response information and additional response information provided for a user utterance, and update information on the degree of association between a task and an additional task for the user utterance based on the acquired feedback. For example, while, with respect to a user utterance "What is the temperature of Seoul today?", a response such as "The temperature of Seoul today is 20 degrees, the weather is fine, the concentration of fine dust is fine at 10, and the population density is low" is being provided, if a user feedback ending responses after weather information is input, the processor 120 may decrease the degree of association between the temperature check task and the atmospheric pollution check task and the degree of association between the temperature check task and the population density check task.

The processor 120 may receive input of an additional user utterance regarding response information and additional response information provided for a user utterance, and update information on the degree of association between a task for the user utterance and a task for the additional user utterance based on a task for the input additional user utterance. For example, if, with respect to a user utterance "What is the temperature of Seoul today?", a response such as "The temperature of Seoul today is 20 degrees, and the weather is fine" is provided, and then an additional user utterance such as "How is the concentration of fine dust in Seoul today?" is input, the processor 120 may provide a response such as "Today's concentration of fine dust in Seoul is fine as 10", and update information on the degree of association between the temperature check task and the atmospheric pollution check task.

The processor 120 may provide response information for a user utterance, and provide an inquiry message for providing additional response information. That is, the processor 120 may not provide response information and additional response information for a user utterance together, but provide an inquiry message inquiring whether to be provided additional response information. For example, if a user utterance "What is the temperature of Seoul today?" is input, the processor 120 may provide a response to the user utterance and an inquiry message such as "The temperature of Seoul today is 20 degrees. Would you like to know about the weather of Seoul, too?". If a user command for the inquiry message is received, the processor 120 may provide an additional response for the user command. For example, the processor 120 may provide a response to the user utterance and an inquiry message for providing additional response information such as "Would you like to know about the weather of Seoul, too?". If the processor 120 receives a user command "Yes" to the user inquiry "Would you like to know about the weather of Seoul, too?", the processor 120 may provide an additional response like "Today's weather of Seoul is fine".

The processor 120 may store a task for a user utterance and an additional task related to the task in the form of, for example, ontology in the memory 110 based on information on the degree of association between a task for a user utterance and an additional task related to the task for the user utterance. For example, the processor 120 may store a first task and a second task in the form of ontology in the memory 110 based on the degree of association between the first task and the second task.

The aforementioned various operations of the processor 120 may be performed by an artificial intelligence model. For example, at least one step among an operation of determining a task related to a user utterance, an operation of determining a response pattern, an operation of acquiring additional response information, and an operation of providing additional response information is performed by an artificial intelligence model, and the artificial intelligence model may include a plurality of layers respectively including at least one node, and each of the at least one node may be a neural network model having a connection weight for interpreting an input value.

Figure 3:
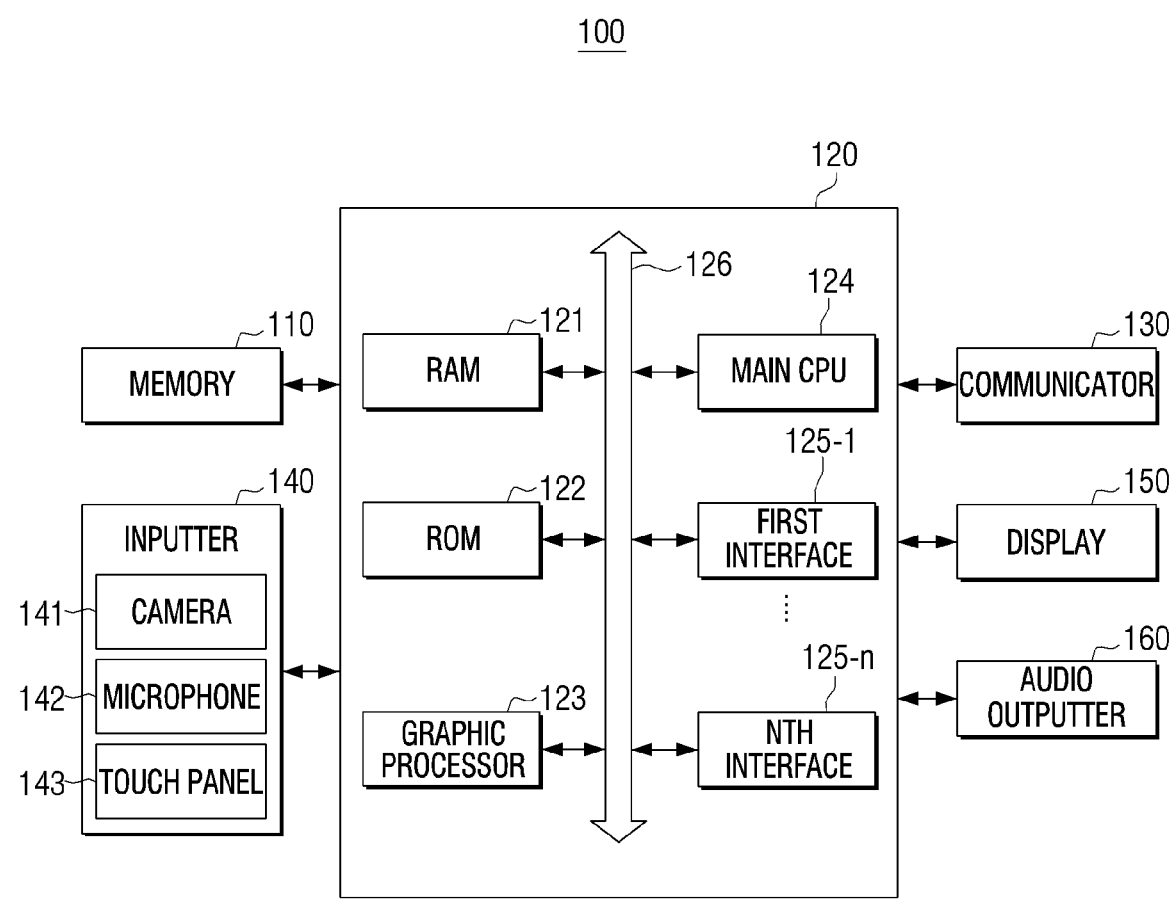
FIG. 3 is a block diagram illustrating an example configuration of an example electronic apparatus according to an embodiment of the disclosure.

FIG. 3 is a block diagram illustrating an example configuration of an example electronic apparatus according to an embodiment of the disclosure.

As illustrated in FIG. 3, the electronic apparatus 100 may further include a communicator (e.g., including communication circuitry) 130, an inputter (e.g., including input circuitry) 140, a display 150, and an audio outputter (e.g., including audio output circuitry) 160, in addition to the memory 110 and the processor 120. However, components of the electronic apparatus 100 are not limited to the aforementioned components, and some components may be added or omitted depending on needs.

The communicator 130 may include various communication circuitry and communication with an external apparatus. A communicative connection between the communicator 130 and an external apparatus may include communication through a third apparatus (e.g., a repeater, a hub, an access point, a server, or a gateway). Wireless communication may include, for example, and without limitation, cellular communication using at least one of LTE, LTE Advance (LTE-A), code division multiple access (CDMA), wideband CDMA (WCDMA), a universal mobile telecommunications system (UMTS), Wireless Broadband (WiBro), a Global System for Mobile Communications (GSM), or the like. According to an embodiment, wireless communication may include, for example, at least one of wireless fidelity (WiFi), Bluetooth, Bluetooth low energy (BLE), Zigbee, near field communication (NFC), Magnetic Secure Transmission, radio frequency (RF), or a body area network (BAN). Wired communication may include, for example, at least one of a universal serial bus (USB), a high definition multimedia interface (HDMI), a recommended standard 232 (RS-232), power line communication, or a plain old telephone service (POTS). Networks wherein wireless communication or wired communication is performed may include at least one of a telecommunication network, for example, a computer network (e.g.: a LAN or a WAN), the Internet, or a telephone network.

The inputter 140 may include various input circuitry and receive input of a user command. The inputter 140 may include, for example, and without limitation, a camera 141, a microphone 142, a touch panel 143, or the like.

The camera 141 may include various circuitry for acquiring image data around the electronic apparatus 100. The camera 141 may photograph a still image and a moving image. For example, the camera 141 may include one or more of an image sensor (e.g.: a front surface sensor or a rear surface sensor), a lens, an image signal processor (ISP), or flash (e.g.: an LED or a xenon lamp, etc.). The microphone 142 may include various circuitry for acquiring sound around the electronic apparatus 100. The microphone 142 may receive input of an external acoustic signal and generate electronic voice information. The microphone 142 may use various noise removal algorithms for removing noises generated in a process of receiving input of an external acoustic signal. Image information or voice information input through the camera 141 or the microphone 142 may be input as an input value of an artificial intelligence model.

The touch panel 143 may include various circuitry and receive input of various user inputs. The touch panel 143 may receive input of data by a user manipulation. Also, the touch panel 143 may be included in combination with a display that will be described later.

The inputter 140 may be various components for receiving input of various data in addition to the aforementioned camera 141, microphone 142, and touch panel 143.

The display 150 may include a component for outputting various images. The display 150 for providing various images may be implemented as display panels in various forms. For example, display panels may be implemented as various display technologies such as, for example, and without limitation, a Liquid Crystal Display (LCD), Organic Light Emitting Diodes (OLEDs), Active-Matrix Organic Light-Emitting Diodes (AM-OLEDs), Liquid Crystal on Silicon (LcoS), Digital Light Processing (DLP), etc. The display 150 may be coupled to at least one of the front surface area, the side surface area, or the rear surface area of the electronic apparatus 100 in the form of a flexible display.

The audio outputter 160 may include various audio output circuitry for outputting not only various kinds of audio data for which various processing works such as decoding or amplification, and noise filtering were performed by an audio processor, but also various kinds of notification sounds or voice messages. The audio processor is a component performing processing of audio data. At the audio processor, various processing such as decoding or amplification, and noise filtering of audio data may be performed. Audio data processed at the audio processor 150 may be output to the audio outputter 160. In particular, the audio outputter may be implemented as a speaker, but this is merely an example, and the audio outputter may be implemented as an output terminal that can output audio data.

The processor 120 may include various processing circuitry and controls the overall operations of the electronic apparatus 100, as described above. The processor 120 may include a RAM 121, a ROM 122, a main CPU 124, a graphic processor 123, first to nth interfaces 125-1 to 125-n, and a bus 126. The RAM 121, the ROM 122, the main CPU 124, the graphic processor 123, and the first to nth interfaces 125-1 to 125-n, etc. may be connected with one another through the bus 126.

The ROM 122 stores a set of instructions, etc. for system booting. When a turn-on instruction is input and power is supplied, the main CPU 124 copies the O/S stored in the memory in the RAM 121 according to the instruction stored in the ROM 122, and boots the system by executing the O/S. When booting is completed, the main CPU 124 copies various types of application programs stored in the memory in the RAM 121, and performs various types of operations by executing the application programs copied in the RAM 121.

The main CPU 124 accesses the memory 110, and performs booting using the O/S stored in the memory 110. The main CPU 124 performs various operations using various types of programs, contents, data, etc. stored in the memory 110.

The first to nth interfaces 125-1 to 125-n may be connected with the aforementioned various types of components. One of the interfaces may be a network interface connected with an external apparatus through a network.

Figure 5A:
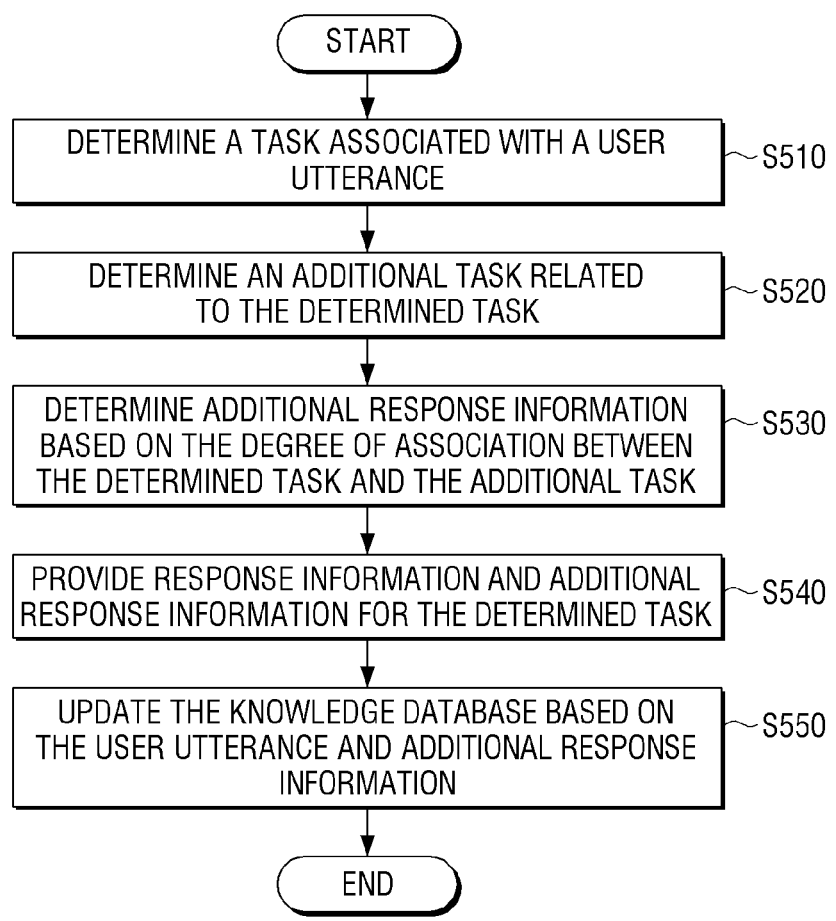
FIG. 5A is a flowchart illustrating an example method for providing a response to a user utterance according to an embodiment of the disclosure.

FIG. 5A is a flowchart illustrating an example method for providing a response to a user utterance according to an embodiment of the disclosure.

When a user utterance is input, the electronic apparatus may determine a task associated with the input user utterance at operation S510. For example, the electronic apparatus 100 may acquire the entity and the intention of a user utterance input through the natural language understanding part 420 and determine a task for the user utterance. According to an embodiment of the disclosure, the electronic apparatus 100 may acquire a dialog act, a main act, and an entity in a user utterance through the natural language understanding part 420. A dialog act may refer, for example, to an intentional act of a speaker for performing the purpose of the dialog included in the utterance, and indicates whether the utterance of the user is a request of an act (Request), a request of the value of a certain variable to the listener by the speaker (WH-Question), or a request of an answer in YES/NO to the listener by the speaker (YN-Question), or provision of information to the listener by the speaker (inform), etc. Also, a main act refers to semantic information indicating an act desired by the utterance through a dialog in a specific domain. In addition, an entity is information added for specifying the meaning of an act intended in a specific domain.

For example, where a user utterance is "How's the weather today?", the dialog act in the user utterance may be 'a WH-Question', the main act may be 'a weather check', and the entity may be 'today'. Accordingly, a task for the user utterance may be determined as checking today's weather and providing a response.

The electronic apparatus 100 may determine additional information that is not included in the user utterance but is associated with the main act as an entity. Information on which additional information is associated with the main act may be stored in advance in the electronic apparatus 100. For example, where additional information associated with 'a weather check' which is the main act is the current location of the electronic apparatus 100, the electronic apparatus 100 may determine the current location of the electronic apparatus 100 (for example, 'Yangjae-dong') as the entity, although it is not included in the user utterance "How's the weather today?". The electronic apparatus 100 may determine a task for the user utterance as checking Yangjae-dong's weather today and providing a response based on 'today' which is an entity acquired from the user utterance and 'Yangjae-dong' which is an entity acquired from additional information associated with the main act.

The electronic apparatus 100 may determine an additional task related to the determined task at operation S520. Specifically, the electronic apparatus 100 may determine an additional task related to the determined task based, for example, on the past user utterance history information and user preference information. For example, where the determined task is a weather check task, the electronic apparatus 100 may determine a temperature check task and an atmospheric pollution check task as additional tasks based on the user utterance history and user preference information.

The electronic apparatus 100 may determine additional response information based on information on the degree of association between the determined task and additional tasks at operation S530. For example, the electronic apparatus 100 may determine a task of which degree of association is greater than a threshold value as an additional task, among a plurality of additional tasks related to the determined task. For example, if a task determined according to a user utterance is a temperature check, and the degree of association between the temperature check task and a weather check task is 0.9, and the degree of association between the temperature check task and an atmospheric pollution check task is 0.5, and the threshold value is 0.7, the electronic apparatus 100 may determine the weather check task of which degree of association with the temperature check task is greater than 0.7 as an additional task, and may not determine the atmospheric pollution check task of which degree of association with the temperature check task is smaller than 0.7 as an additional task. A threshold value may be determined by various methods. As an example, a threshold value may be determined by user setting. As another example, a threshold value may be output by inputting a user utterance and a response to the user utterance into a trained artificial intelligence model as an input value.

In addition, the electronic apparatus 100 may provide response information and additional response information for the determined task at operation S540. As an example, the natural language generating part 440 of the electronic apparatus 100 may generate a response to a user utterance as a natural language based on response information and additional response information for a determined task and provide the response. However, the disclosure is not limited thereto, and the electronic apparatus 100 can provide response information and additional response information for a determined task in the form of a text.

If a response for a user utterance is provided, the electronic apparatus 100 may update the knowledge database 460 based on the input user utterance and additional response information for the user utterance at operation S550. For example, the electronic apparatus 100 may input an input user utterance and additional response information for the user utterance into a trained artificial intelligence model as an input value, and update information on the degree of association among a plurality of tasks, and store the updated information on the degree of association in the knowledge database 460. As another example, the electronic apparatus 100 may input an input user utterance and additional response information for the user utterance into a trained artificial intelligence model as an input value, and update a threshold value for a task related to the user utterance, and update the updated threshold value in the knowledge database 460.

Figure 5B:
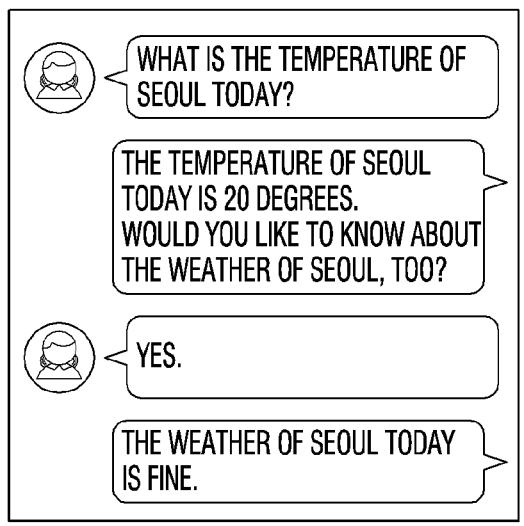
FIG. 5B is a diagram illustrating an example method for providing an additional response according to another embodiment of the disclosure.

FIG. 5B is a diagram illustrating an example method for providing an additional response according to another embodiment of the disclosure.

For example, the electronic apparatus 100 may provide response information to a user utterance, and provide an inquiry message for providing additional response information. For example, the electronic apparatus 100 may not provide response information and additional response information for a user utterance together, but provide an inquiry message inquiring whether to be provided additional response information. For example, if a user utterance "What is the temperature of Seoul today?" is input, the electronic apparatus 100 may provide a response to the user utterance and an inquiry message such as "The temperature of Seoul today is 20 degrees. Would you like to know about the weather of Seoul, too?". If a user command for the inquiry message is received, the electronic apparatus 100 may provide an additional response for the user command That is, the electronic apparatus 100 may provide a response to the user utterance and an inquiry message for providing additional response information such as "Would you like to know about the weather of Seoul, too?". If the electronic apparatus 100 receives a user command "Yes" to the user inquiry "Would you like to know about the weather of Seoul, too?", the electronic apparatus 100 may provide an additional response like "Today's weather of Seoul is fine".

Figure 6A:
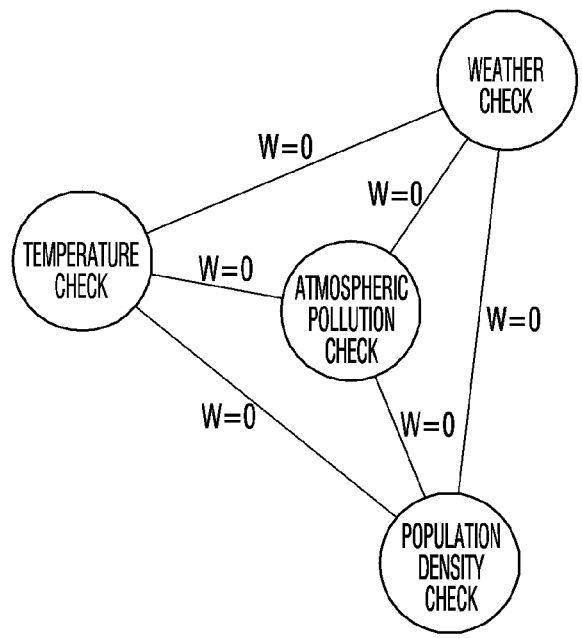
FIG. 6A is a diagram illustrating an example method for updating information on the degree of association among tasks according to an embodiment of the disclosure.
Figure 6A:
Figure 6A:
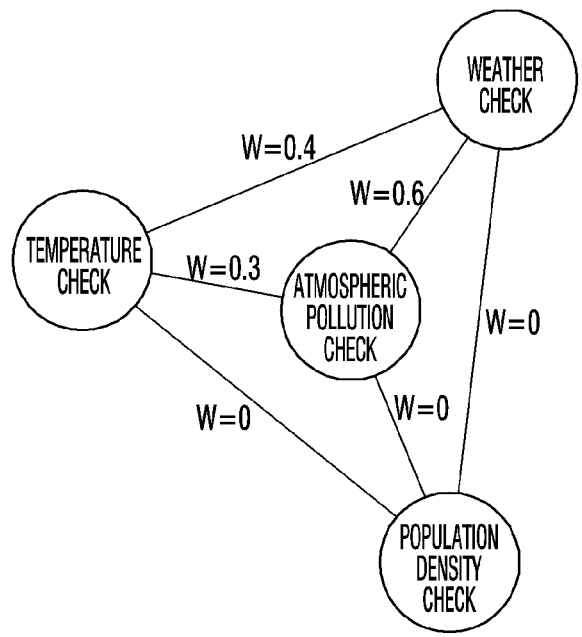
Figure 6B:
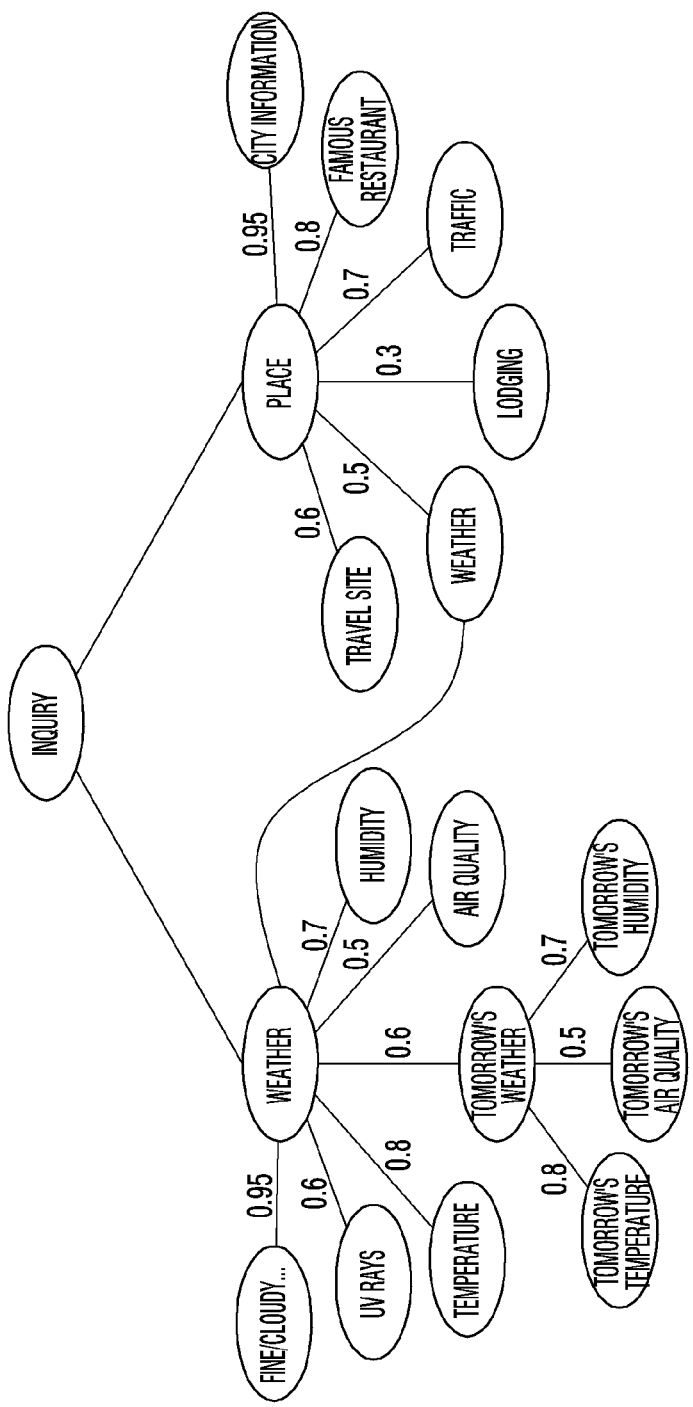
FIG. 6B is a diagram illustrating an example regarding the information on the degree of association among tasks stored in the knowledge database 460 according to an embodiment of the disclosure.

FIG. 6A is a diagram illustrating an example method for updating information on the degree of association among tasks according to an embodiment of the disclosure, and FIG. 6B is a diagram illustrating an example regarding the information on the degree of association among tasks stored in the knowledge database 460 according to an embodiment of the disclosure.

As illustrated in FIG. 6A, the electronic apparatus 100 may update information on the degree of association among a temperature check task, a weather check task, an atmospheric pollution check task, and a population density check task based on the user utterance history and user preference information.

For example, as illustrated in the left side of FIG. 6A, in the initial state, the degree of association among each task may be 0. In this example, the electronic apparatus 100 may provide temperature information for a user utterance requesting a temperature check, provide weather information for a user utterance requesting a weather check, provide atmospheric pollution information for a user utterance requesting an atmospheric pollution check, and provide population density information for a user utterance requesting a population density check.

When user utterances and response information for user utterances are accumulated in the knowledge database 460, the electronic apparatus 100 may update information on the degree of association among each task based on the accumulated data. As an example, the electronic apparatus 100 may update information on the degree of association among each task based on information on associated tasks for each of the same entities in a user utterance. For example, if a user utterance related to a plurality of tasks (a temperature check, a weather check, an atmospheric pollution check, etc.) for the same entity (place) is input, the electronic apparatus 100 may update information on the degree of association among each of the plurality of tasks for the same entity.

As another example, if there is an additional user utterance for a response to a user utterance, the electronic apparatus 100 may update information on the degree of association among each task based on information on a task for the user utterance and information on a task for the additional user utterance. For example, if there are a response to a user utterance and an additional user utterance, the electronic apparatus 100 may increase the degree of association between a task for the user utterance and a task for the additional user utterance. For example, after the electronic apparatus 100 provides a response informing the temperature with respect to a user utterance requesting a temperature check, if an additional user utterance requesting a weather check is input, the electronic apparatus 100 may heighten the degree of association between a temperature check task and a weather check task. The electronic apparatus 100 can update task information in consideration of the order that the user utterance and the additional user utterance were input. For example, if a task for a user utterance and tasks for additional utterances are input in the order of a temperature check task, a weather check task, and an atmospheric pollution check task, the electronic apparatus 100 may set the degree of association between the temperature check task and the weather check task to be higher than the degree of association between the temperature check task and the atmospheric pollution check task.

As another example, the electronic apparatus 100 may update information among each task based on a feedback for a response to a user utterance. For example, while a response to a user utterance is being provided, if a user command stopping the response is input, the electronic apparatus 100 may decrease the degree of association between a task corresponding to the response that was being provided after the user command stopping the response was input and a task corresponding to the user utterance. As an example, a case wherein a response that the electronic apparatus 100 will provide to a user utterance "What is the temperature today?" is "Today's temperature is 20 degrees and the weather is fine" can be assumed. Where the electronic apparatus 100 provides a response regarding today's temperature, and while the electronic apparatus 100 is providing a response regarding the weather, a user command stopping the response is input and the response regarding the weather cannot be provided, the electronic apparatus 100 may decrease the degree of association between the temperature check task and the weather check task.

The electronic apparatus 100 can update the degree of association among tasks based on the user utterance history and user preference information, and can also update a threshold value for determining an additional task.

In conclusion, the electronic apparatus 100 may update information on the degree of association among each task and store the information in the knowledge database 460 as in FIG. 6A, based on history information on the user utterance and user preference information. For example, as shown in FIG. 6B, the information on the degree of association between "weather" and "fine/cloudy . . . , UV rays, temperature, humidity, air quality and tomorrow's weather", the information on the degree of association "tomorrow's weather" and "tomorrow's temperature, tomorrow's air quality and tomorrow's humidity" and the information on the degree of association between "place" and "travel site, weather, lodging, traffic, famous restaurant and city information" may be stored in the knowledge database 460 according to the various embodiments of the disclosure as described above.

Figure 7:
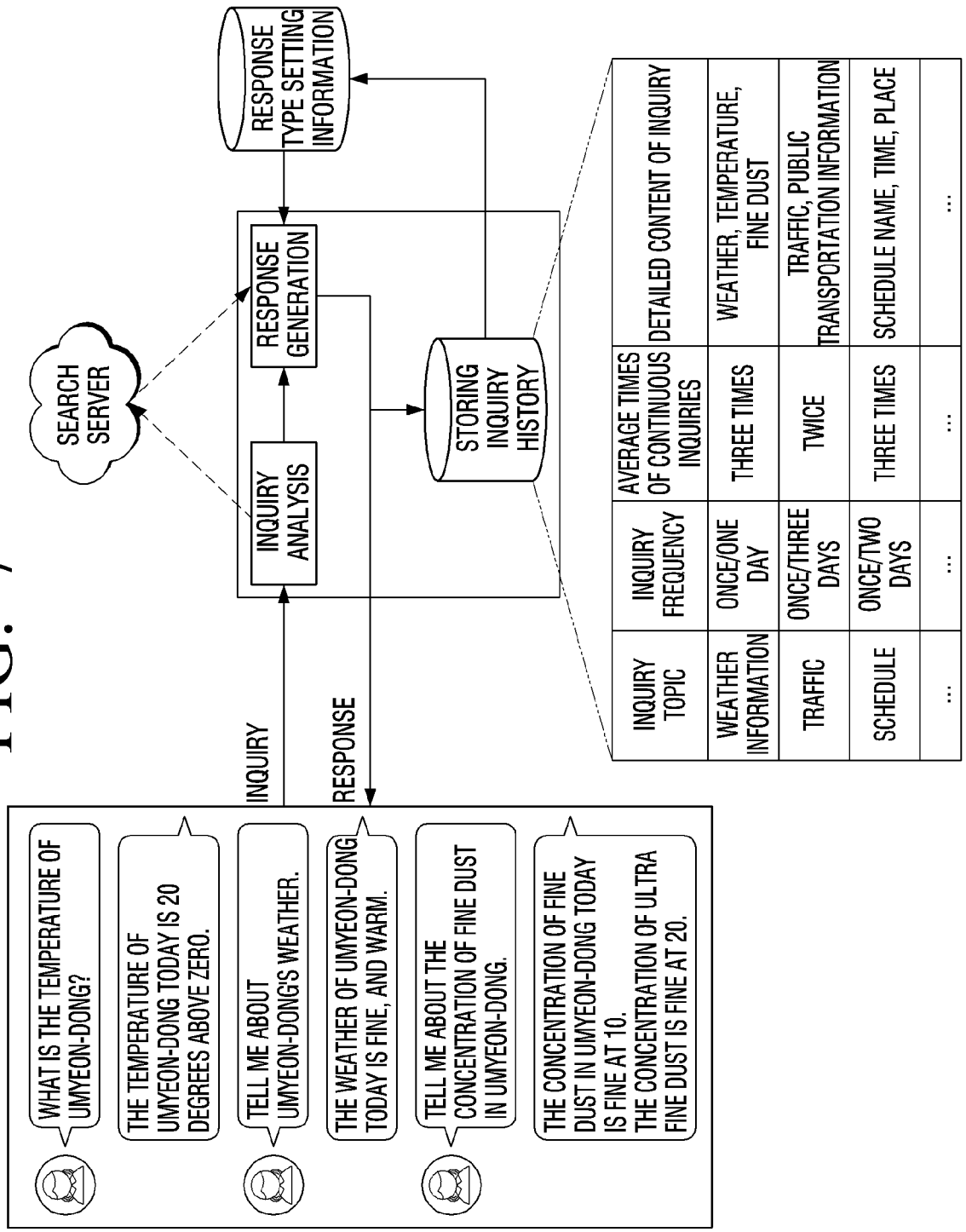
FIG. 7 is a diagram illustrating an example of providing a response to a user utterance according to an embodiment of the disclosure.

FIG. 7 is a diagram illustrating an example of providing a response to a user utterance according to another embodiment of the disclosure.

As illustrated in FIG. 7, if a user utterance is input, the electronic apparatus 100 may analyze the user utterance and generate a response for the user utterance. The electronic apparatus 100 may store the user utterance and information related to the user utterance in the form of a table. For example, the stored table may include information on topics of inquiries (e.g., weather information, the traffic schedule, etc.), the frequency of inquiries (e.g., n times per day, etc.), the average times of continuous inquiries (the times of additional inquiries regarding a user utterance), and detailed contents of inquiries.

For example, the electronic apparatus 100 may store not only a response to a user utterance, but also match an additional user utterance and response information regarding the additional user utterance and store them. If a user utterance is input after a table for various user utterance history is acquired, the electronic apparatus 100 may determine a response for the user utterance based on the table regarding the various user utterance history.

FIGS. 8A, 8B, 9, 10 and 11 are diagrams illustrating an example in which a response to a user utterance is an inquiry type according to another embodiment of the disclosure.

FIGS. 5A, 5B, 6 and 7 were described as an example in which the response type of the electronic apparatus 100 to a user utterance is a response provision type, but the disclosure is not limited thereto. For example, where there is an unclear part in a user utterance, the electronic apparatus 100 may not provide an answer to the user utterance, but provide a response inquiring about an insufficient part regarding the user utterance. For example, if, as a result of analyzing a user utterance, there is an omitted part in an entity or a task, or there are a plurality of tasks for the user utterance, the electronic apparatus 100 may provide an inquiry requesting an omitted task or entity or provide an inquiry inquiring which task is to be selected among a plurality of tasks. For example, where a user utterance such as "How's the weather today?" is input, the electronic apparatus 100 may determine that an entity related to a place is omitted, and provide a response such as "Would you like to know about the weather of Seoul today?". Where a user utterance such as "Call Saebom" is input (see, e.g., FIG. 8A), the electronic apparatus 100 may determine that there are a plurality of "Saeboms" searched, and provide a response such as "Who should I call among Saebom Choi, Saebom Lee, and Saebom Park?".

If a response type for a user utterance is an inquiry provision type, the electronic apparatus 100 may provide one of a selection type of receiving selection of one of a plurality of alternatives regarding the user utterance or a Yes/No type of inquiring which one among a plurality of alternatives is correct as a response to the user utterance.

Figure 8A:
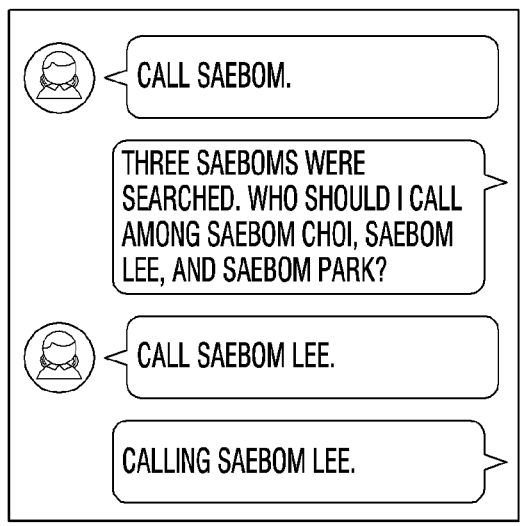
FIG. 8A is a diagram illustrating an example in which a response to a user utterance is an inquiry type according to another embodiment of the disclosure.
Figure 8B:
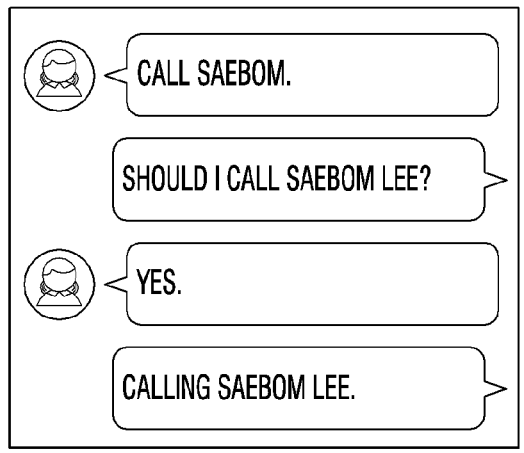
FIG. 8B is a diagram illustrating an example in which a response to a user utterance is an inquiry type according to another embodiment of the disclosure.

For example, if a user utterance such as "Call Saebom" is input, the electronic apparatus 100 may decide a response to the user utterance as an inquiry provision type. As illustrated in FIG. 8A, the electronic apparatus 100 may provide a response to a user utterance as a selection type for receiving selection of one of a plurality of alternatives (Saebom Choi, Saebom Lee, and Saebom Park) such as "Three Saeboms were searched. Who should I call among Saebom Choi, Saebom Lee, and Saebom Park?". As illustrated in FIG. 8B, the electronic apparatus 100 may provide a response to a user utterance as a Yes/No type of determining one of a plurality of alternatives, and inquiring whether the determined alternative is correct, like "Should I call Saebom Lee?".

The electronic apparatus 100 may decide whether to provide a response as a selection type, or provide a response as a Yes/No type by various methods. As an example, the electronic apparatus 100 may decide a response provision type according to the user setting. For example, the electronic apparatus 100 may provide a response as a selection type if a user sets to provide a response as a selection type, and provide a response as a Yes/No type if a user sets to provide a response as a Yes/No type. As another example, the electronic apparatus 100 may determine a task for a user utterance, determine a plurality of alternatives for the determined task, and decide one type between a selection type and a Yes/No type based on information on the degree of association between the determined task and the plurality of alternatives and the threshold value. For example, if a user utterance such as "Call Saebom" is input, the electronic apparatus 100 may acquire a call sending task for the user utterance, and acquire a plurality of alternatives (Saebom Choi, Saebom Lee, and Saebom Park) for the subject to send a call. Where the degree of association between the call sending task and Saebom Choi is 0.1, and the degree of association between the call sending task and Saebom Lee is 0.9, and the degree of association between the call sending task and Saebom Park is 0.5, and the threshold value is 0.7, as there is one alternative greater than the threshold value (Saebom Lee), the electronic apparatus 100 may provide a response such as "Should I call Saebom Lee?" (a Yes/No type). Where the degree of association between the call sending task and Saebom Choi is 0.1, and the degree of association between the call sending task and Saebom Lee is 0.9, and the degree of association between the call sending task and Saebom Park is 0.5, and the threshold value is 0.3, as there are a plurality of alternatives greater than the threshold value (Saebom Lee, Saebom Park), the electronic apparatus 100 may provide a response such as "Who should I call between Saebom Lee and Saebom Park?" (a selection type). As still another example, where the degree of association between the call sending task and Saebom Choi is 0.1, and the degree of association between the call sending task and Saebom Lee is 0.9, and the degree of association between the call sending task and Saebom Park is 0.5, and the threshold value is 0.3, the electronic apparatus 100 may provide a response such as "Who should I call among Saebom Choi, Saebom Lee, and Saebom Park?" (a selection type). For example, if there are a plurality of alternatives greater than a threshold value, the electronic apparatus 100 can provide an alternative smaller than the threshold value (Saebom Park) as a response.

Figure 9:
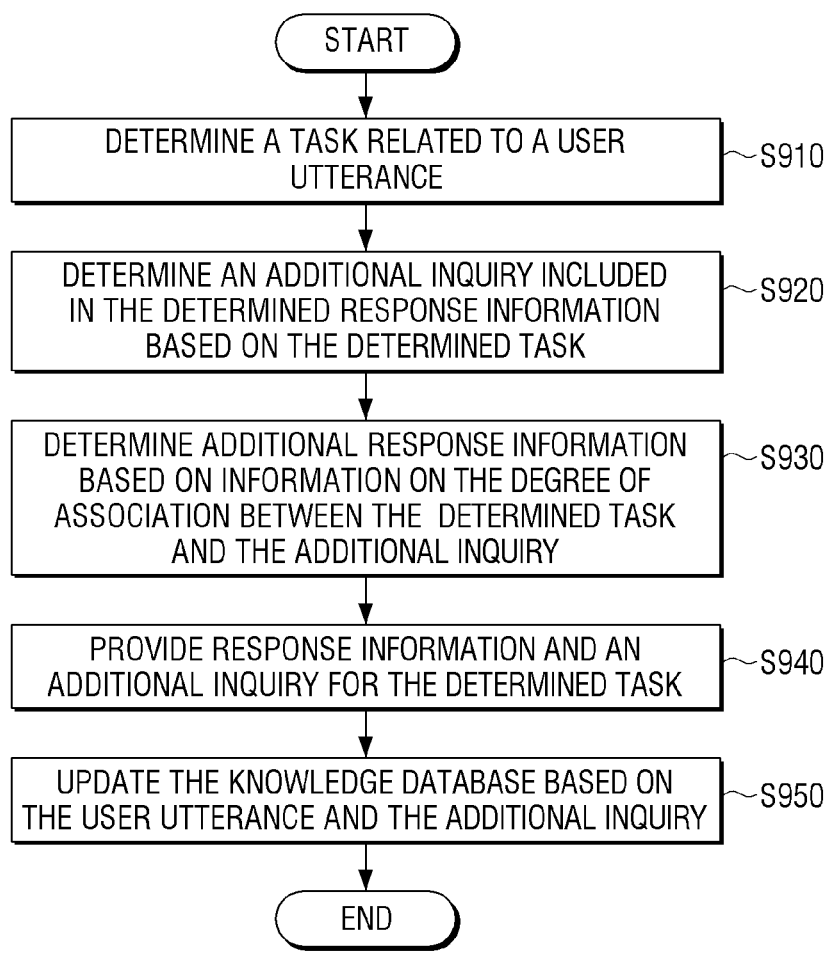
FIG. 9 is a flowchart illustrating an example method for providing an inquiry type response to a user utterance according to an embodiment of the disclosure.

FIG. 9 is a flowchart illustrating an example method for providing an inquiry type response to a user utterance according to an embodiment of the disclosure.

When a user utterance is input, the electronic apparatus 100 may determine a task related to the input user utterance at operation S910. For example, the electronic apparatus 100 may acquire an entity and a task of a user utterance input through the natural language understanding part 420 and determine a task for the user utterance. As an example, where a user utterance is "Call Saebom," the determined task may be sending of a call.

The electronic apparatus 100 may determine an additional inquiry included in the determine response information based on the determined task at operation S920. For example, there may be a plurality of pieces of information necessary for performing the task. For example, where there are a plurality of pieces of information necessary for performing the task, the electronic apparatus 100 may determine an additional inquiry for determining one of a plurality of pieces of information. For example, an additional inquiry may be a selection type such as "Three Saeboms were searched. Who should I call among Saebom Choi, Saebom Lee, and Saebom Park?", or a Yes/No type such as "Should I call Saebom Lee?".

The electronic apparatus 100 may determine additional response information based on information on the degree of association between the determined task and the additional inquiry at operation S930. For example, the electronic apparatus 100 may determine a task for a user utterance, determine a plurality of pieces of information for the determined task, and determine one type between a selection type or a Yes/No type based on information on the degree of association between the determined task and an additional inquiry decided based on a plurality of alternatives and a threshold value. As described above, where there is one additional inquiry greater than a threshold value, the electronic apparatus 100 may decide a Yes/No type as additional information, and where there are a plurality of additional inquiries greater than a threshold value, the electronic apparatus 100 may determine selection types as additional inquiries.

The electronic apparatus 100 may provide response information and an additional inquiry (or an additional response) for the determined task at operation S940. As an example, the natural language generating part 440 of the electronic apparatus 100 may generate a response to a user utterance as a natural language based on response information and additional response information for the decided task and provide the response. However, the disclosure is not limited thereto, and the electronic apparatus 100 can provide response information and additional response information for the decided task in the form of a text.

Where a response for a user utterance is provided, the electronic apparatus 100 may update the knowledge database 460 based on the input user utterance and additional response information (e.g., additional inquiry) for the user utterance at operation S950. For example, the electronic apparatus 100 may input the input user utterance and additional response information for the user utterance into a trained artificial intelligence model as an input value, and update information on the degree of association among a plurality of tasks, and store the updated information on the degree of association in the knowledge database 460. As another example, the electronic apparatus 100 may input the input user utterance and additional response information for the user utterance into a trained artificial intelligence model as an input value, and update a threshold value for a task related to the user utterance, and update the updated threshold value in the knowledge database 460.

Figure 10:
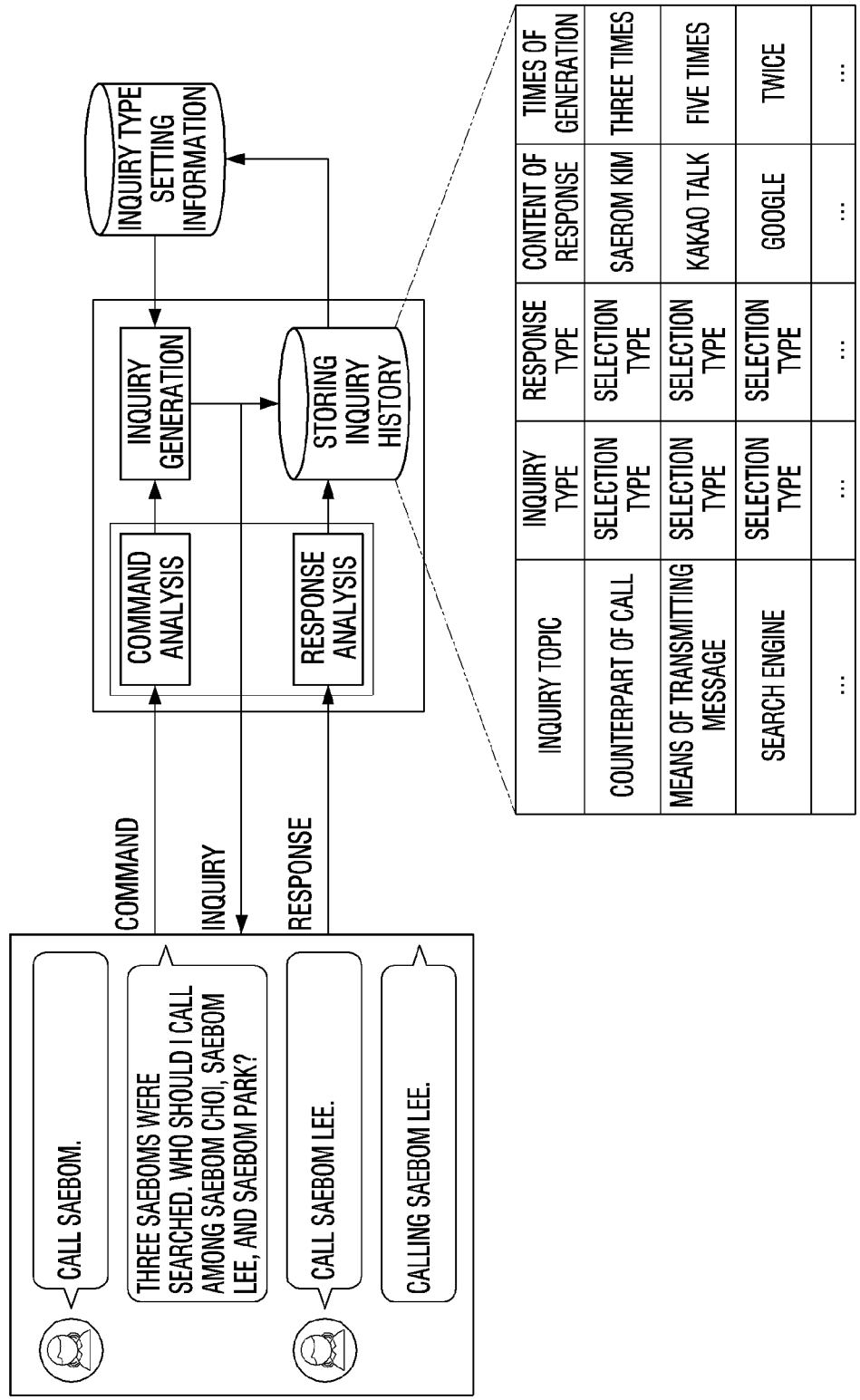
FIG. 10 is a diagram illustrating an example of providing a response to a user utterance according to still another embodiment the disclosure.

FIG. 10 is a diagram illustrating and example of providing a response to a user utterance according to still another embodiment of the disclosure.

As illustrated in FIG. 10, when a user utterance is input, the electronic apparatus 100 may analyze the user utterance, and generate an inquiry regarding the user utterance. When an additional user utterance for the inquiry regarding the user utterance is input, the electronic apparatus 100 may provide a response to the additional user utterance. The electronic apparatus 100 may store the user utterance and information related to the user utterance in the form of a table. For example, the stored table may include information on the inquiry topic (the counter part of the call, the means of transmitting a message, the search engine, etc.), the inquiry type (a selection type, a Yes/No type, etc.), the response type (a selection type, a Yes/No type, etc.), the content of the response, the times of generation of inquiries, etc.

Figure 11:
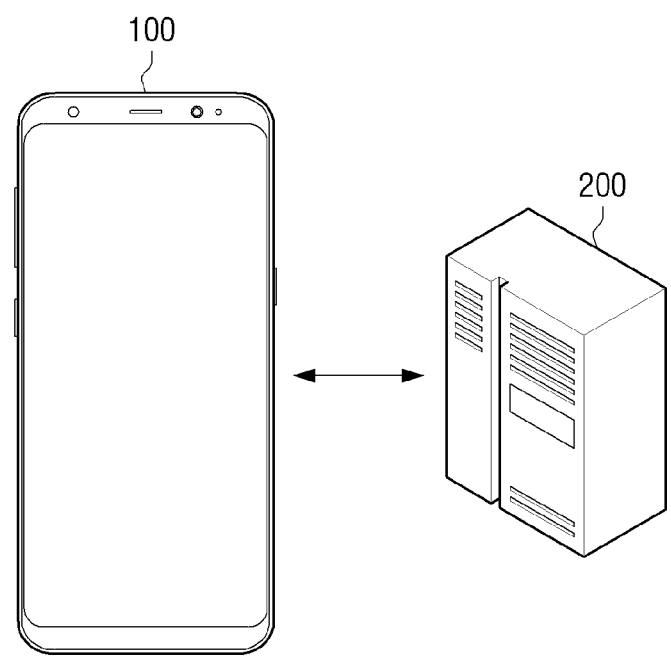
FIG. 11 is a diagram illustrating an example system including an electronic apparatus and a server according to an embodiment of the disclosure.

For example, the electronic apparatus 100 may match an additional inquiry regarding a user utterance, a response type for the additional inquiry, and the content of a response to the additional inquiry, and store them. When a user utterance is input after a table regarding various user utterance history is acquired, the electronic apparatus 100 may decide a response to the user utterance based on the table regarding various user utterance history.

Where the aforementioned various operations of the electronic apparatus 100 are performed by an artificial intelligence model, the electronic apparatus 100 may operate the artificial intelligence model, but the disclosure is not limited thereto. For example, as illustrated in FIG. 11, the operation of the artificial intelligence model may be performed at a server 200.

For example, when a user utterance is input, the electronic apparatus 100 may transmit the input user utterance to the server 200. The server 200 may determine a task related to the user utterance based on the received user utterance, determine a response pattern including the task related to the user utterance and an additional task related to the determined task based on the determined task, acquire response information for the task related to the user utterance and additional response information for the additional task, and generate a natural language based on the acquired response information and additional response information and transmit the natural language to the electronic apparatus 100.

According to an embodiment, the electronic apparatus 100 and the server 200 may be connected to each other by remote communication.

The electronic apparatus 100 and the server 200 may be connected to each other by short distance communication (e.g., Wi-Fi, Wi-Fi direct, Bluetooth). The server 200 may, for example, be a device located in a user's home. For example, the server 200 may additionally operate an artificial intelligence model for the electronic apparatus 100 while preforming a separate function while being located in a user's home, such as, for example, and without limitation, a TV, a refrigerator, an air conditioner, an AI speaker, or the like.

According to an embodiment, the server 200 may store several compositions of the artificial intelligence model. For example, the server 200 may store only knowledge data base 460 in a conversation system of FIG. 4. The server 200 may store a separate knowledge database 460 for each user, and based on user information of the electronic apparatus 100 connected to the server, transmit a corresponding knowledge data base 460 of user to the electronic apparatus 100. The server 200 may transmit the knowledge data base 460 at regular intervals to the electronic apparatus 100, or transmit the same to the electronic apparatus 100 whenever the knowledge data base 460 of the server 200 is updated.

Meanwhile, in FIGS. 8A, 8B, 9, 10 and 11, the electronic apparatus 100 providing an additional inquiry for acquiring additional information where there is an unclear part in a user utterance was described. However, even if there is an unclear part in a user utterance, the electronic apparatus 100 may acquire additional information based on user context information and provide a response to the user. For example, where a user utterance is "How's the weather?", the electronic apparatus 100 may determine that a place for requesting a weather check is unclear. Instead of providing an additional inquiry requesting a place for a weather check to a user, the electronic apparatus 100 may determine the current location of the electronic apparatus 100 using GPS information, etc., and provide the weather information of the determined location. As another example, where a user utterance is "Call Saebom", instead of providing an additional inquiry such as "Who should I call among Saebom Choi, Saebom Lee, and Saebom Park?" or "Should I call Saebom Choi?", the electronic apparatus 100 may determine that there is no log of having called Saebom Lee and Saebom Park in the past, and call Saebom Choi.

Figure 12:
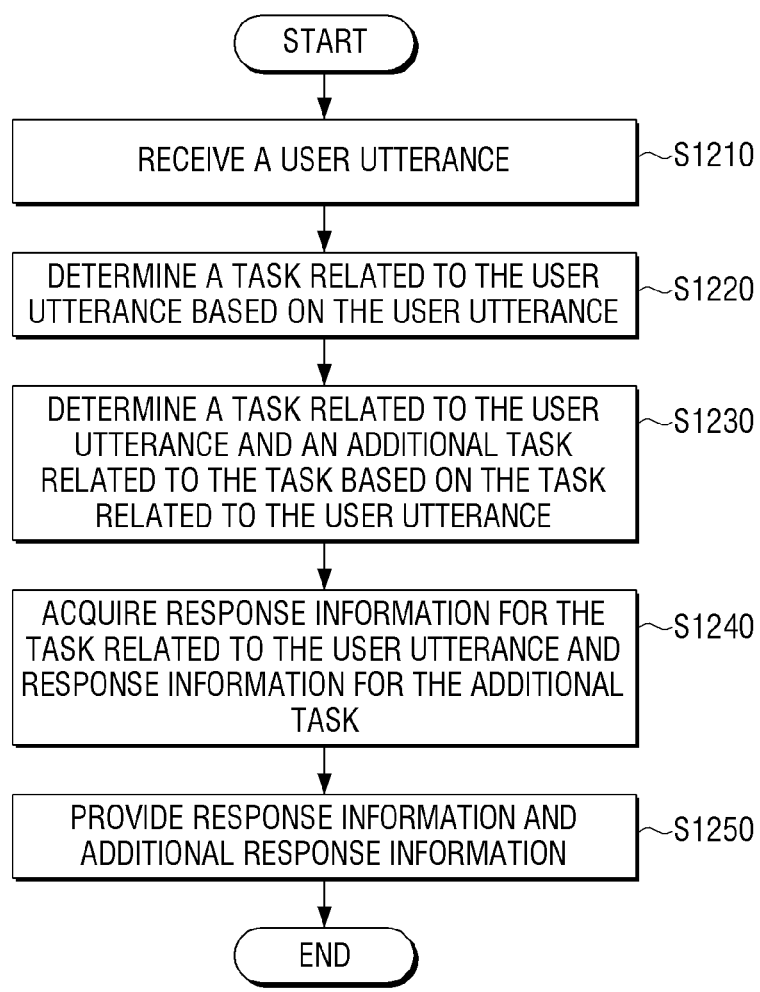
FIG. 12 is a flowchart illustrating an example method of controlling an electronic apparatus according to an embodiment of the disclosure.

FIG. 12 is a flowchart illustrating an example method of controlling an electronic apparatus according to an embodiment of the disclosure.

The electronic apparatus 100 may receive a user utterance at operation S1210. The electronic apparatus 100 may determine a task related to the user utterance based on the received user utterance at operation S1220. For example, where a user utterance is "How's the weather today?", the electronic apparatus 100 may determine "a weather check" as a task related to the user utterance. As another example, where a user utterance is "Call Saebom", the electronic apparatus 100 may determine "sending of a call" as a task related to the user utterance.

The electronic apparatus 100 may determine a task related to the user utterance and an additional task related to the task based on the task related to the user utterance at operation S1230. For example, the electronic apparatus 100 may determine a task of which degree of association with the task related to the user utterance is greater than a threshold value as an additional task. As described above, the degree of association with a task related to user utterance and a threshold value may be determined based on user utterance history and user preference information.

The electronic apparatus 100 may acquire response information for the task related to the user utterance and response information for the additional task at operation S1240. The electronic apparatus 100 may provide the acquired response information and additional response information at operation S1250.

Figure 13:
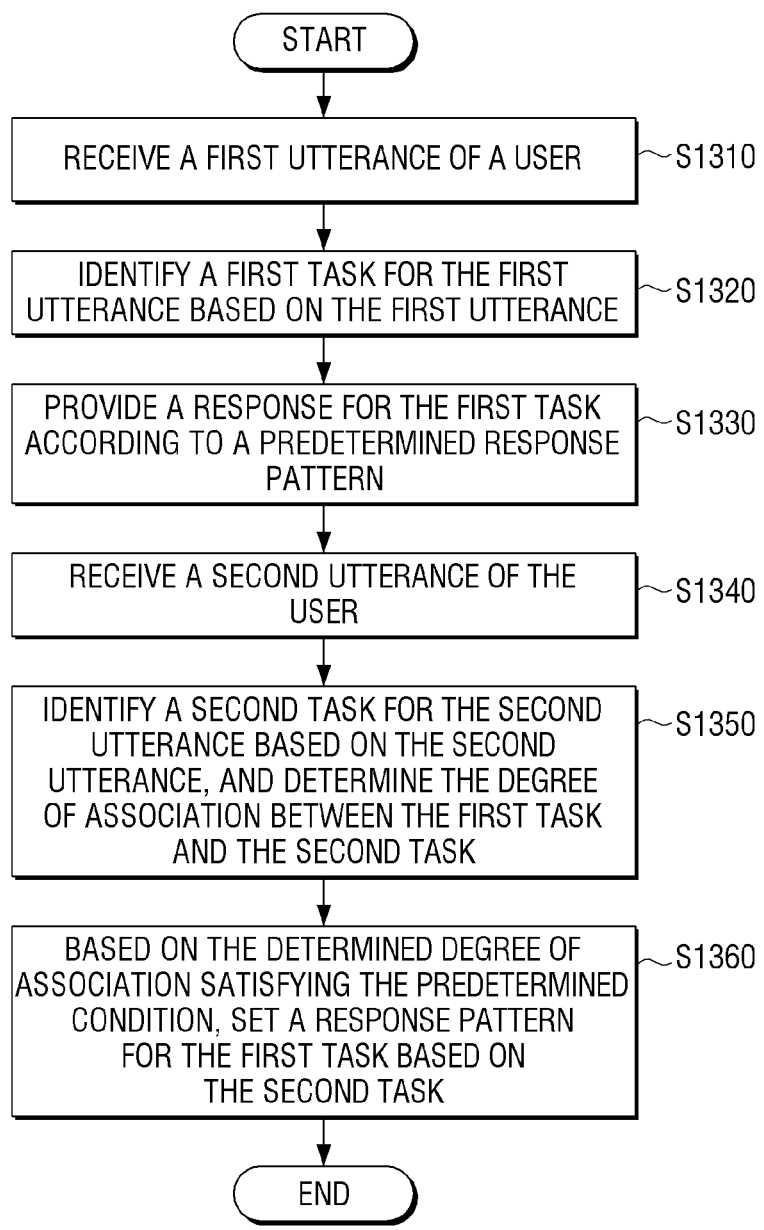
FIG. 13 is a flowchart illustrating an example method of controlling an electronic apparatus according to another embodiment of the disclosure.

FIG. 13 is a flowchart illustrating an example method of controlling an electronic apparatus according to another embodiment of the disclosure.

Referring to FIG. 13, the electronic apparatus 100 may receive input of a first utterance of a user at operation S1310. The first utterance may be, for example, "What is the temperature of Umyeon-dong?".

The electronic apparatus 100 may identify a first task for the first utterance based on the first utterance at operation S1320. The first task may be, for example, a weather check of Umyeon-dong.

The electronic apparatus 100 may provide a response for the first task according to a predetermined response pattern at operation S1330. For example, a response for the first task provided according to a predetermined response pattern may be "The weather of Umyeong-dong today is fine, and warm".

The electronic apparatus 100 may receive input of a second utterance of the user at operation S1340. For example, the second utterance may be "Tell me about the concentration of fine dust in Umeyon-dong".

The electronic apparatus 100 may identify a second task for the second utterance based on the second utterance, and determine the degree of association between the first task and the second task at operation S1350.

Separately from determination of the degree of association, the electronic apparatus 100 may provide a response according to a predetermined response pattern regarding the second task. For example, the response may be "The concentration of fine dust in Umyeon-dong is fine at 10, and the concentration of ultra fine dust is fine at 20".

If the degree of association determined at operation S1350 satisfies a predetermined condition, the electronic apparatus 100 may set a response pattern for the first task based on the second task at operation S1360.

According to an embodiment, a response pattern for the first task may be set such that a response pattern for the second task can be additionally reflected to the response pattern for the first task. After a response pattern for the first task is set based on the second task as described above, if a first utterance is input, the electronic apparatus may provide a response according to the set response pattern. For example, when the first utterance which is "What is the temperature of Umyeon-dong?" is input again, the response pattern for the second task is additionally reflected, and a response such as "The weather of Umeyon-dong today is fine, and warm. And the concentration of fine dust is fine at 10, and the concentration of ultra-fine dust is fine at 20" may be provided according to the set response pattern for the first task.

According to another embodiment, a response pattern for the second task may be set such that a response pattern for the first task can be additionally reflected to the response pattern for the second task. After a response pattern for the second task is set based on the first task as described above, if a second utterance is input, the electronic apparatus may provide a response according to the set response pattern. For example, when the second utterance which is "What is the level of fine dust of Umyeon-dong?" is input again, the response pattern for the first task is additionally reflected, and a response such as "The weather of Umeyon-dong today is fine, and warm. And the concentration of fine dust is fine at 10, and the concentration of ultra-fine dust is fine at 20" may be provided according to the set response pattern for the second task.

According to the aforementioned example embodiments, a response is not provided according to a fixed response pattern, but a response pattern may be adaptively changed as a user's habit, preference, etc. are reflected as the user uses an electronic apparatus, and accordingly, there are effects that a response that suits the intention of the user better can be provided, and the user can acquire a desired response at once without inquiring several times, and the like.

A function related to the artificial intelligence according to the disclosure may be operated through the processor 120 and the memory 110.

The processor 120 may include, for example, one or a plurality of processors 120. The one or the plurality of processors 120 may include, for example, and without limitation, a general purpose processor, such as a CPU, an AP, or the like, a graphics dedicated processor, such as a GPU, a VPU or the like, an artificial intelligence processor such as an NPU, or the like.

One or a plurality of processors 120 may control the electronic apparatus 100 to process input data according to a predefined operation rule or an artificial intelligence model stored in the memory 110. The predefined operation rule or the artificial intelligence model is characterized by being made through training.

Being made through learning may refer, for example, to a predefined operation rule of desired feature or an artificial intelligence model being generated by applying a learning algorithm to a plurality of learning data. Such learning may be made in a device itself that the artificial intelligence is performed according to the disclosure, or be made through a separate server/system.

The artificial intelligence model may include a plurality of neural network layers. Each layer may have a plurality of weight values and may perform calculation of layers through a calculation result of a previous layer and a calculation of the plurality of weight values. Examples of neural networks include, for example, and without limitation, convolutional neural network (CNN), deep neural network (DNN), recurrent neural network (RNN), restricted boltzmann machine (RBM), deep belief network (DBN), bidirectional recurrent deep neural network (BRDNN), deep Q-networks, or the like, and the neural network in the disclosure is not limited to the above examples.

The learning algorithm may refer, for example, to a method of training a predetermined target device (e.g., a robot) using a plurality of learning data so that the predetermined target device make a decision or make a prediction by itself. Examples of the learning algorithm include, for example, and without limitation, supervised learning, unsupervised learning, semi-supervised learning or reinforcement learning, learning algorithms in the disclosure are not limited to the above examples except where specified.

The term "a part" or "a module" used in the disclosure includes a unit including hardware, software, or firmware, or any combination thereof, and it may be interchangeably used with terms, for example, logic, a logical block, a component, or a circuit. Also, "a part" or "a module" may be a component including an integrated body or a minimum unit performing one or more functions or a portion thereof. For example, a module may include an application-specific integrated circuit (ASIC).

The various embodiments of the disclosure may be implemented as software including instructions stored in machine-readable storage media, which can be read by machines (e.g.: computers). The machines may refer, for example, to apparatuses that call instructions stored in a storage medium, and can operate according to the called instructions, and the apparatuses may include an electronic apparatus according to the aforementioned embodiments (e.g.: an electronic apparatus 100). Where an instruction is executed by a processor, the processor may perform a function corresponding to the instruction by itself, or using other components under its control. An instruction may include a code made by a compiler or a code executable by an interpreter. A storage medium that is readable by machines may be provided in the form of a non-transitory storage medium. The 'non-transitory' storage medium may not include signals, and is tangible, but does not indicate whether data is stored in the storage medium semi-permanently or temporarily.

According to an embodiment of the disclosure, methods according to the various embodiments described in the disclosure may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

Further, each of the components according to the aforementioned various embodiments (e.g.: a module or a program) may include a singular object or a plurality of objects. Among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner Operations performed by a module, a program, or other components according to the various embodiments may be executed sequentially, in parallel, repetitively, or heuristically. Or, at least some of the operations may be executed in a different order or omitted, or other operations may be added.

While various example embodiments have been illustrated and described, it will be understood that the various example embodiments are intended to be illustrative, not limiting. Accordingly, one of ordinary skill in the art will understand that various changes in form and detail may be made without departing from the true spirit and full scope of the disclosure, which includes, for example, the appended claims and their equivalents.

What is claimed is:

1. A method of controlling an electronic apparatus, the method comprising:
   receiving input of a first utterance;
   identifying a first task for the first utterance based on the first utterance;
   providing a response to the first task based on a predetermined response pattern set for the first task;
   receiving input of a second utterance after the response to the first task is provided;
   identifying a second task for the second utterance based on the second utterance;
   providing a response to the second task based at least on a predetermined response pattern set for the second task;
   determining a degree of association between the first task and the second task; and
   setting a response pattern for the first task based at least on the determined degree of association between the first task and the second task satisfying a predetermined condition.

2. The method of claim 1,
   wherein the response pattern is determined while including at least one of information related to a length of a response to an utterance or information related to types of information included in the response to the utterance.

3. The method of claim 1,
   wherein the predetermined response pattern set for the first task includes a response pattern selected by a command, or an automatically set response pattern.

4. The method of claim 3, further comprising:
   inputting a voice based on the first utterance into a trained artificial intelligence model to obtain information on an acoustic feature of the first utterance; and
   recognizing a user based on the information on the obtained acoustic feature,
   wherein the predetermined response pattern set for the first task is determined based on a recognized conversation history and preference information of the user.

5. The method of claim 1,
   wherein the predetermined condition includes a condition wherein information on the degree of association between the first task and the second task is equal to or greater than a threshold value.

6. The method of claim 1, further comprising:
   determining whether a third task for a third utterance is associated with the first task based on receiving input of the third utterance; and
   providing a response based on the predetermined set response pattern for the first task.

7. The method of claim 1, further comprising:
   receiving input of a third utterance; and
   identifying a third task for the third utterance based on the third utterance, and determining a degree of association between the first task and the third task, and
   wherein the setting further comprises:
   determining priorities of the second task and the third task based on the determined degree of association between the first task and the third task satisfying a predetermined condition; and
   setting a response pattern for the first task based on the determined priorities, the second task, and the third task.

8. The method of claim 5, further comprising:
   acquiring feedback for the provided response; and
   updating the degree of association between the first task and the second task based on the acquired feedback.

9. The method of claim 1, further comprising:
   storing the first task and the second task in a form of ontology based on the degree of association between the first task and the second task.

10. The method of claim 1,
    wherein at least one of the identifying a first task, the determining the degree of association, the setting a response pattern, or the providing a response is performed by an artificial intelligence model, and
    the artificial intelligence model includes a plurality of layers respectively including at least one node, and each of the at least one node includes a neural network model having a connection weight for interpretation of an input value.

11. An electronic apparatus comprising:
    a memory configured to store at least one command; and
    a processor, comprising circuitry, coupled to the memory and configured to execute the at least one command,
    wherein the processor is configured to control the electronic apparatus to:
    receive input of a first utterance,
    identify a first task for the first utterance based on the first utterance, provide a response to the first task based on a predetermined response pattern set for the first task, receive input of a second utterance after the response to the first task is provided, identify a second task for the second utterance based on the second utterance, provide a response to the second task based on a predetermined response pattern set for the second task, determine a degree of association between the first task and the second task, and set a response pattern for the first task based on the second task based at least on the determined degree of association between the first task and the second task satisfying a predetermined condition.

12. The electronic apparatus of claim 11,
wherein the response pattern is determined while including at least one of information related to a length of a response to an utterance or information related to types of information included in the response to the utterance.

13. The electronic apparatus of claim 11,
wherein the predetermined response pattern set for the first task includes a response pattern selected by a command, or an automatically set response pattern.

14. The electronic apparatus of claim 13,
wherein the processor is configured to control the electronic apparatus to: input a voice based on the first utterance into a trained artificial intelligence model to obtain information on an acoustic feature of the first utterance, and recognize a user based on the information on the obtained acoustic feature, and
wherein the predetermined response pattern set for the first task is determined based on a recognized conversation history and preference information of the user.

15. The electronic apparatus of claim 11,
wherein the predetermined condition includes a condition wherein information on the degree of association between the first task and the second task is equal to or greater than a threshold value.

16. The electronic apparatus of claim 11,
wherein the processor is configured to control the electronic apparatus to:

determine whether a third task for a third utterance is associated with the first task based on receiving input of the third utterance, and provide a response based on the predetermined set response pattern for the first task.

17. The electronic apparatus of claim 11,
wherein the processor is configured to control the electronic apparatus to:
receive input of a third utterance, identify a third task for the third utterance based on the third utterance, and determine the degree of association between the first task and the third task, and
determine priorities of the second task and the third task based on the determined degree of association between the first task and the third task satisfying a predetermined condition, and
set a response pattern for the first task based on the determined priorities, the second task, and the third task.

18. The electronic apparatus of claim 16,
wherein the processor is configured to control the electronic apparatus to:
acquire feedback for the provided response, and update the degree of association between the first task and the second task based on the acquired feedback.

19. The electronic apparatus of claim 11,
wherein the processor is configured to control the electronic apparatus to:
store the first task and the second task in a form of ontology in the memory based on the degree of association between the first task and the second task.

20. The electronic apparatus of claim 11,
wherein at least one of the identifying a first task, the determining the degree of association, the setting a response pattern, or the providing a response is performed by an artificial intelligence model, and
the artificial intelligence model includes a plurality of layers respectively including at least one node, and each of the at least one node including a neural network model having a connection weight for interpretation of an input value.

* * * * *